United States Patent
Rao et al.

(10) Patent No.: US 11,792,155 B2
(45) Date of Patent: Oct. 17, 2023

(54) METHOD AND APPARATUS FOR ENHANCED CLIENT PERSISTENCE IN MULTI-SITE GSLB DEPLOYMENTS

(71) Applicant: VMware, Inc., Palo Alto, CA (US)

(72) Inventors: Sudarshana Kandachar Sridhara Rao, Bangalore (IN); Rajagopal Sreenivasan, Bangalore (IN); Raghav Kempanna, Bangalore (IN); Sreeram Iyer, Bengaluru (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/837,368

(22) Filed: Jun. 10, 2022

(65) Prior Publication Data

US 2022/0400098 A1 Dec. 15, 2022

(30) Foreign Application Priority Data

Jun. 14, 2021 (IN) .............................. 202141026460
Jun. 14, 2021 (IN) .............................. 202141026462

(51) Int. Cl.
*H04L 61/4511* (2022.01)
*H04L 61/2514* (2022.01)
(Continued)

(52) U.S. Cl.
CPC ...... *H04L 61/4511* (2022.05); *H04L 61/2514* (2013.01); *H04L 61/5007* (2022.05); *H04L 67/1095* (2013.01); *H04L 61/5038* (2022.05)

(58) Field of Classification Search
CPC ............ H04L 61/4511; H04L 61/5007; H04L 61/2514; H04L 67/1095; H04L 61/5038
(Continued)

(56) References Cited

U.S. PATENT DOCUMENTS

| RE4,814 E | 3/1872 | Madurell |
| 5,109,486 A | 4/1992 | Seymour |

(Continued)

FOREIGN PATENT DOCUMENTS

| AU | 2011352884 A1 * | 7/2013 | ....... H04L 29/12066 |
| CA | 2607005 C * | 2/2012 | ........... G06Q 10/107 |
| WO | 2020086956 A1 | 4/2020 | |

OTHER PUBLICATIONS

Non-Published commonly Owned U.S. Appl. No. 18/102,696, filed Jan. 28, 2023, 40 pages, VMware, Inc.

(Continued)

*Primary Examiner* — Khanh Q Dinh
(74) *Attorney, Agent, or Firm* — ADELI LLP

(57) ABSTRACT

Some embodiments provide a method that, at a first domain name system (DNS) cluster of a set of DNS clusters, receives a DNS request from a client. The first DNS cluster identifies, based on an identifier of the client in the DNS request, a home DNS cluster of the client. The method forwards the DNS request to the home DNS cluster. The home DNS cluster supplies a DNS response to the client. Identifying the home DNS cluster, in some embodiments, includes performing a hash on the identifier of the client. Supplying the DNS response, in some embodiments, includes receiving a virtual IP (VIP) address associated with one of a plurality of sets of application servers to the client and providing the received VIP address to the client in the DNS response.

18 Claims, 9 Drawing Sheets

(51) Int. Cl.
*H04L 61/5007* (2022.01)
*H04L 67/1095* (2022.01)
*H04L 61/5038* (2022.01)

(58) Field of Classification Search
USPC .............. 709/218, 220, 224, 226, 228
See application file for complete search history.

(56) References Cited

U.S. PATENT DOCUMENTS

| | | |
|---|---|---|
| 5,781,703 A | 7/1998 | Desai et al. |
| 6,148,335 A | 11/2000 | Haggard et al. |
| 6,449,739 B1 | 9/2002 | Landan |
| 6,515,968 B1 | 2/2003 | Combar et al. |
| 6,714,979 B1 | 3/2004 | Brandt et al. |
| 6,754,706 B1 | 6/2004 | Swildens et al. |
| 6,792,458 B1 | 9/2004 | Muret et al. |
| 6,792,460 B2 | 9/2004 | Oulu et al. |
| 6,901,051 B1 | 5/2005 | Hou et al. |
| 6,976,090 B2 | 12/2005 | Ben-Shaul et al. |
| 6,996,778 B2 | 2/2006 | Rajarajan et al. |
| 7,076,695 B2 | 7/2006 | McGee et al. |
| 7,130,812 B1 | 10/2006 | Iyer et al. |
| 7,246,159 B2 | 7/2007 | Aggarwal et al. |
| 7,353,272 B2 | 4/2008 | Robertson et al. |
| 7,430,610 B2 | 9/2008 | Pace et al. |
| 7,636,708 B2 | 12/2009 | Garcea et al. |
| 7,701,852 B1 | 4/2010 | Hohn et al. |
| 7,743,380 B2 | 6/2010 | Seidman et al. |
| 7,933,988 B2 | 4/2011 | Nasuto et al. |
| 7,990,847 B1 | 8/2011 | Leroy et al. |
| 8,032,896 B1 | 10/2011 | Li et al. |
| 8,112,471 B2 | 2/2012 | Wei et al. |
| 8,131,712 B1 | 3/2012 | Thambidorai et al. |
| 8,412,493 B2 | 4/2013 | Duchenay et al. |
| 8,499,066 B1 | 7/2013 | Zhang et al. |
| 8,588,069 B2 | 11/2013 | Todd et al. |
| 8,856,797 B1 | 10/2014 | Siddiqui et al. |
| 8,874,725 B1 | 10/2014 | Ganjam et al. |
| 8,977,728 B1 | 3/2015 | Martini |
| 9,032,078 B2 | 5/2015 | Beerse et al. |
| 9,047,648 B1 | 6/2015 | Lekutai et al. |
| 9,071,537 B2 | 6/2015 | Talla et al. |
| 9,083,710 B1 | 7/2015 | Yadav |
| 9,210,056 B1 | 12/2015 | Choudhary et al. |
| 9,256,452 B1 | 2/2016 | Suryanarayanan et al. |
| 9,288,193 B1 | 3/2016 | Gryb et al. |
| 9,300,552 B2 | 3/2016 | Dube et al. |
| 9,300,553 B2 | 3/2016 | Dube et al. |
| 9,319,343 B2 | 4/2016 | Khandelwal et al. |
| 9,329,915 B1 | 5/2016 | Chandrasekharapuram et al. |
| 9,450,700 B1 | 9/2016 | Tonder et al. |
| 9,459,980 B1 | 10/2016 | Arguelles |
| 9,467,476 B1 | 10/2016 | Shieh et al. |
| 9,477,784 B1 | 10/2016 | Bhave et al. |
| 9,483,286 B2 | 11/2016 | Basavaiah et al. |
| 9,491,164 B1 | 11/2016 | Fay et al. |
| 9,495,222 B1 | 11/2016 | Jackson |
| 9,531,614 B1 | 12/2016 | Nataraj et al. |
| 9,535,805 B2 | 1/2017 | Ananthanarayanan et al. |
| 9,558,465 B1 | 1/2017 | Arguelles et al. |
| 9,571,516 B1 | 2/2017 | Curcic et al. |
| 9,608,880 B1 | 3/2017 | Goodall |
| 9,613,120 B1 | 4/2017 | Kharatishvili et al. |
| 9,626,275 B1 | 4/2017 | Hitchcock et al. |
| 9,674,302 B1 | 6/2017 | Khalid et al. |
| 9,680,699 B2 | 6/2017 | Cohen et al. |
| 9,692,811 B1 | 6/2017 | Tajuddin et al. |
| 9,697,316 B1 | 7/2017 | Taylor et al. |
| 9,712,410 B1 | 7/2017 | Char et al. |
| 9,716,617 B1 | 7/2017 | Ahuja et al. |
| 9,729,414 B1 | 8/2017 | Oliveira et al. |
| 9,749,888 B1 | 8/2017 | Colwell et al. |
| 9,798,883 B1 | 10/2017 | Gil et al. |
| 9,817,699 B2 | 11/2017 | Stich et al. |
| 9,830,192 B1 | 11/2017 | Crouchman et al. |
| 9,882,830 B2 | 1/2018 | Taylor et al. |
| 9,935,829 B1 | 4/2018 | Miller et al. |
| 9,959,188 B1 | 5/2018 | Krishnan |
| 9,967,275 B1 | 5/2018 | Kolman et al. |
| 9,979,617 B1 | 5/2018 | Meyer et al. |
| 10,003,550 B1 | 6/2018 | Babcock et al. |
| 10,015,094 B1 * | 7/2018 | Akers ............... H04L 61/4511 |
| 10,127,097 B2 | 11/2018 | Talla et al. |
| 10,212,041 B1 | 2/2019 | Rastogi et al. |
| 10,237,135 B1 | 3/2019 | Alabsi et al. |
| 10,313,211 B1 | 6/2019 | Rastogi et al. |
| 10,372,600 B2 | 8/2019 | Mathur |
| 10,547,521 B1 | 1/2020 | Roy et al. |
| 10,594,562 B1 | 3/2020 | Rastogi et al. |
| 10,630,543 B1 | 4/2020 | Wei et al. |
| 10,693,734 B2 | 6/2020 | Rastogi et al. |
| 10,728,121 B1 | 7/2020 | Chitalia et al. |
| 10,873,541 B2 | 12/2020 | Callau et al. |
| 10,931,548 B1 | 2/2021 | Iyer et al. |
| 10,999,168 B1 | 5/2021 | Gupta et al. |
| 11,038,839 B1 * | 6/2021 | Vettaikaran ........... H04L 61/103 |
| 11,038,840 B1 * | 6/2021 | Vettaikaran ......... H04L 61/5069 |
| 11,044,180 B2 | 6/2021 | Rastogi et al. |
| 11,171,849 B2 | 11/2021 | Rastogi et al. |
| 11,283,697 B1 | 3/2022 | Rajagopalan et al. |
| 11,290,358 B2 | 3/2022 | Basavaiah et al. |
| 11,411,825 B2 | 8/2022 | Rastogi et al. |
| 11,513,844 B1 | 11/2022 | Aleti et al. |
| 11,582,120 B2 | 2/2023 | Basavaiah et al. |
| 2002/0078150 A1 | 6/2002 | Thompson et al. |
| 2002/0198984 A1 | 12/2002 | Goldstein et al. |
| 2002/0198985 A1 | 12/2002 | Fraenkel et al. |
| 2003/0191837 A1 | 10/2003 | Chen |
| 2003/0236877 A1 | 12/2003 | Allan |
| 2004/0054680 A1 | 3/2004 | Kelley et al. |
| 2004/0064552 A1 | 4/2004 | Chong et al. |
| 2004/0103186 A1 | 5/2004 | Casati et al. |
| 2004/0143637 A1 * | 7/2004 | Koning ............... H04L 67/1001 |
| | | 709/212 |
| 2004/0243607 A1 | 12/2004 | Tummalapalli |
| 2005/0010578 A1 | 1/2005 | Doshi |
| 2005/0060574 A1 | 3/2005 | Klotz et al. |
| 2005/0108444 A1 | 5/2005 | Flauaus et al. |
| 2005/0120160 A1 | 6/2005 | Plouffe et al. |
| 2005/0172018 A1 | 8/2005 | Devine et al. |
| 2005/0188221 A1 | 8/2005 | Motsinger et al. |
| 2006/0167939 A1 | 7/2006 | Seidman et al. |
| 2006/0224725 A1 | 10/2006 | Bali et al. |
| 2006/0242282 A1 | 10/2006 | Mullarkey |
| 2006/0271677 A1 | 11/2006 | Mercier |
| 2007/0136331 A1 | 6/2007 | Hasan et al. |
| 2007/0226554 A1 | 9/2007 | Greaves et al. |
| 2008/0104230 A1 | 5/2008 | Nasuto et al. |
| 2008/0126534 A1 | 5/2008 | Mueller et al. |
| 2008/0183876 A1 | 7/2008 | Duvur et al. |
| 2009/0049524 A1 | 2/2009 | Farrell et al. |
| 2009/0154366 A1 | 6/2009 | Rossi |
| 2009/0199196 A1 | 8/2009 | Peracha |
| 2010/0030915 A1 * | 2/2010 | Kiefer .................... H04L 63/08 |
| | | 709/238 |
| 2010/0077462 A1 * | 3/2010 | Joffe .................. H04L 63/1408 |
| | | 726/5 |
| 2010/0208742 A1 * | 8/2010 | Kafle ...................... H04L 69/32 |
| | | 370/401 |
| 2010/0279622 A1 | 11/2010 | Shuman et al. |
| 2010/0287171 A1 | 11/2010 | Schneider |
| 2010/0293296 A1 | 11/2010 | Hsu et al. |
| 2011/0126111 A1 | 5/2011 | Gill et al. |
| 2011/0196890 A1 | 8/2011 | Pfeifle et al. |
| 2012/0101800 A1 | 4/2012 | Miao et al. |
| 2012/0110185 A1 | 5/2012 | Ganesan et al. |
| 2012/0131591 A1 | 5/2012 | Moorthi et al. |
| 2012/0254443 A1 | 10/2012 | Ueda |
| 2012/0254444 A1 | 10/2012 | Harchol-Balter et al. |
| 2012/0291099 A1 | 11/2012 | Grube et al. |
| 2013/0013953 A1 | 1/2013 | Eck et al. |
| 2013/0086230 A1 | 4/2013 | Guerra et al. |
| 2013/0086273 A1 | 4/2013 | Wray et al. |
| 2013/0179289 A1 | 7/2013 | Calder et al. |

(56) References Cited

U.S. PATENT DOCUMENTS

| | | |
|---|---|---|
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0211559 A1 | 8/2013 | Lawson et al. |
| 2013/0212257 A1 | 8/2013 | Murase et al. |
| 2013/0290538 A1 | 10/2013 | Gmach et al. |
| 2013/0326044 A1 | 12/2013 | Maldaner |
| 2013/0343213 A1 | 12/2013 | Reynolds et al. |
| 2013/0346594 A1 | 12/2013 | Banerjee et al. |
| 2014/0006862 A1 | 1/2014 | Jain et al. |
| 2014/0032785 A1 | 1/2014 | Chaudhuri et al. |
| 2014/0059179 A1 | 2/2014 | Lam |
| 2014/0101226 A1 | 4/2014 | Khandekar et al. |
| 2014/0122725 A1 | 5/2014 | Batrouni et al. |
| 2014/0143406 A1 | 5/2014 | Malhotra et al. |
| 2014/0173675 A1 | 6/2014 | Ahmed et al. |
| 2014/0215058 A1 | 7/2014 | Vicat-Blanc et al. |
| 2014/0215621 A1 | 7/2014 | Xaypanya et al. |
| 2014/0229706 A1 | 8/2014 | Kuesel et al. |
| 2014/0280886 A1 | 9/2014 | Burns |
| 2014/0282160 A1 | 9/2014 | Zarpas |
| 2014/0304414 A1 | 10/2014 | Yengalasetti et al. |
| 2014/0344439 A1 | 11/2014 | Kempf et al. |
| 2014/0351226 A1 | 11/2014 | Christodorescu et al. |
| 2015/0058265 A1 | 2/2015 | Padala et al. |
| 2015/0074679 A1 | 3/2015 | Fenoglio et al. |
| 2015/0081880 A1 | 3/2015 | Eaton et al. |
| 2015/0106325 A1 | 4/2015 | Cole et al. |
| 2015/0106523 A1 | 4/2015 | Cui et al. |
| 2015/0124640 A1 | 5/2015 | Chu et al. |
| 2015/0134831 A1 | 5/2015 | Hiroishi |
| 2015/0199219 A1 | 7/2015 | Kim et al. |
| 2015/0212829 A1 | 7/2015 | Kupershtok et al. |
| 2015/0244626 A1 | 8/2015 | Childress et al. |
| 2015/0278061 A1 | 10/2015 | Siciliano et al. |
| 2015/0288682 A1 | 10/2015 | Bisroev et al. |
| 2015/0293954 A1 | 10/2015 | Hsiao et al. |
| 2015/0295780 A1 | 10/2015 | Hsiao et al. |
| 2015/0295796 A1 | 10/2015 | Hsiao et al. |
| 2015/0358391 A1 | 12/2015 | Moon et al. |
| 2015/0370852 A1 | 12/2015 | Shastry et al. |
| 2015/0381558 A1 | 12/2015 | Tuliani |
| 2016/0064277 A1 | 3/2016 | Park et al. |
| 2016/0065609 A1 | 3/2016 | Yan |
| 2016/0087879 A1 | 3/2016 | Matsubara et al. |
| 2016/0094401 A1 | 3/2016 | Anwar et al. |
| 2016/0094410 A1 | 3/2016 | Anwar et al. |
| 2016/0094431 A1 | 3/2016 | Hall et al. |
| 2016/0094483 A1 | 3/2016 | Johnston et al. |
| 2016/0103717 A1 | 4/2016 | Dettori et al. |
| 2016/0105335 A1 | 4/2016 | Choudhary et al. |
| 2016/0127204 A1 | 5/2016 | Ozaki et al. |
| 2016/0149832 A1 | 5/2016 | Liang et al. |
| 2016/0164738 A1 | 6/2016 | Pinski et al. |
| 2016/0182399 A1 | 6/2016 | Zadka et al. |
| 2016/0217022 A1 | 7/2016 | Velipasaoglu et al. |
| 2016/0294701 A1 | 10/2016 | Batrouni et al. |
| 2016/0294722 A1 | 10/2016 | Bhatia et al. |
| 2016/0323197 A1 | 11/2016 | Guzman et al. |
| 2016/0323377 A1 | 11/2016 | Einkauf et al. |
| 2016/0359719 A1 | 12/2016 | Travostino |
| 2016/0378635 A1 | 12/2016 | Taylor et al. |
| 2017/0041386 A1 | 2/2017 | Bhat et al. |
| 2017/0063933 A1 | 3/2017 | Shieh et al. |
| 2017/0093986 A1 | 3/2017 | Kim et al. |
| 2017/0126792 A1 | 5/2017 | Halpern et al. |
| 2017/0134481 A1 | 5/2017 | DeCusatis et al. |
| 2017/0195090 A1 | 7/2017 | Boidol et al. |
| 2017/0324555 A1 | 11/2017 | Wu et al. |
| 2017/0331907 A1 | 11/2017 | Jagannath et al. |
| 2017/0344618 A1 | 11/2017 | Horowitz et al. |
| 2018/0004582 A1 | 1/2018 | Hallenstål |
| 2018/0007126 A1 | 1/2018 | Borst et al. |
| 2018/0018244 A1 | 1/2018 | Yoshimura et al. |
| 2018/0041408 A1 | 2/2018 | Dagum et al. |
| 2018/0041470 A1 | 2/2018 | Schultz et al. |
| 2018/0046482 A1 | 2/2018 | Karve et al. |
| 2018/0063193 A1 | 3/2018 | Chandrashekhar et al. |
| 2018/0088935 A1 | 3/2018 | Church et al. |
| 2018/0089328 A1 | 3/2018 | Bath et al. |
| 2018/0136931 A1 | 5/2018 | Hendrich et al. |
| 2018/0239651 A1 | 8/2018 | Gong et al. |
| 2018/0287902 A1 | 10/2018 | Chitalia et al. |
| 2018/0302375 A1 | 10/2018 | Els |
| 2018/0309637 A1 | 10/2018 | Gill et al. |
| 2018/0335946 A1 | 11/2018 | Wu et al. |
| 2018/0367596 A1 | 12/2018 | Bache et al. |
| 2019/0121672 A1 | 4/2019 | Ding et al. |
| 2019/0123970 A1 | 4/2019 | Rastogi et al. |
| 2019/0199790 A1 | 6/2019 | Yang et al. |
| 2019/0238505 A1 | 8/2019 | Richards et al. |
| 2019/0297014 A1 | 9/2019 | Azgin et al. |
| 2020/0014594 A1 | 1/2020 | Lapiotis et al. |
| 2020/0021326 A1* | 1/2020 | Jiang ................ B29C 45/14639 |
| 2020/0136939 A1 | 4/2020 | Rastogi et al. |
| 2020/0136942 A1 | 4/2020 | Rastogi et al. |
| 2020/0142788 A1 | 5/2020 | Hu et al. |
| 2020/0169479 A1 | 5/2020 | Ireland |
| 2020/0218571 A1 | 7/2020 | Chen |
| 2020/0287794 A1 | 9/2020 | Rastogi et al. |
| 2020/0382390 A1 | 12/2020 | Basavaiah et al. |
| 2020/0382584 A1 | 12/2020 | Basavaiah et al. |
| 2021/0058453 A1 | 2/2021 | Balasubramanian et al. |
| 2021/0119923 A1 | 4/2021 | Brown et al. |
| 2021/0349749 A1 | 11/2021 | Guha |
| 2021/0373971 A1 | 12/2021 | Lu et al. |
| 2022/0141102 A1 | 5/2022 | Rastogi et al. |
| 2022/0147390 A1 | 5/2022 | Akinapelli et al. |
| 2022/0237203 A1 | 7/2022 | Das et al. |
| 2022/0286373 A1 | 9/2022 | Rajagopalan et al. |
| 2022/0353201 A1 | 11/2022 | Navali et al. |
| 2022/0368758 A1 | 11/2022 | Suri et al. |
| 2022/0400097 A1 | 12/2022 | Rao et al. |
| 2023/0018908 A1 | 1/2023 | Yue et al. |
| 2023/0024475 A1 | 1/2023 | Mandeyam et al. |
| 2023/0025679 A1 | 1/2023 | Mandeyam et al. |

OTHER PUBLICATIONS

Author Unknown, "Autoscaler," Compute Engine—Google Cloud Platform, Jun. 29, 2015, 6 pages, retrieved at http://web.archive.org/web/20150629041026/https://cloud.google.com/compute/docs/autoscaler/.

Author Unknown, "Autoscaling," Aug. 20, 2015, 4 pages, Amazon Web Services, retrieved from http://web.archive.org/web/20150820193921/https://aws.amazon.com/autoscaling/.

Author Unknown, "BPF, eBPF, XDP and Bpfilter . . . What are These Things and What do They Mean for the Enterprise?," Apr. 16, 2018, 11 pages, Netronome, retrieved from https://www.netronome.com/blog/bpf-ebpf-xdp-and-bpfilter-what-are-these-things-and-what-do-they-mean-enterprise/.

Catania, V., et al., "PMT: A Tool to Monitor Performances in Distributed Systems," Proceedings of the 3rd IEEE International Symposium on High Performance Distributed Computing, Aug. 2-5, 1994, 8 pages, San Francisco, CA, USA.

Davis, David, "Post #8—Understanding vCenter Operations Badges," David Davis Blog, Apr. 29, 2014, 5 pages, retrieved from http://blogs.vmware.com/management/2014/04/david-davis-on-vcenter-operations-post-8-understanding-vcenter-operations-badges.html.

De George, Andy, "How to Scale an Application," Jun. 16, 2015, 8 pages, Github.com.

Liu, Feng, et al., "Monitoring of Grid Performance Based on Agent," 2007 2nd International Conference on Pervasive Computing and Applications, Jul. 26-27, 2007, 6 pages, IEEE, Birmingham, UK.

Non-Published commonly Owned U.S. Appl. No. 16/905,571, filed Jun. 18, 2020, 40 pages, VMware, Inc.

Non-Published commonly Owned U.S. Appl. No. 17/381,001, filed Jul. 20, 2021, 30 pages, VMware, Inc.

(56) References Cited

OTHER PUBLICATIONS

Non-Published commonly Owned U.S. Appl. No. 17/381,010, filed Jul. 20, 2021, 31 pages, VMware, Inc.
Non-Published commonly Owned U.S. Appl. No. 17/568,806, filed Jan. 5, 2022, 29 pages, VMware, Inc.
Non-Published commonly Owned Related U.S. Appl. No. 17/837,359 with similar specification, filed Jun. 10, 2022, 37 pages, VMware, Inc.
Sevcik, Peter, et al., "Apdex Alliance," May 24, 2014, 5 pages, www.apdex.org.
Wallace, Paul, et al., "Feature Brief: Stingray's Autoscaling Capability," Brocade Community Forums, May 1, 2013, 5 pages, retrieved from http://community.brocade.com/t5/vADC-Docs/Feature-Brief-Stingray-s-Autoscaling-capability/ta-p/73843.
Yar, Mohammed, et al., "Prediction Intervals for the Holt-Winters Forecasting Procedure," International Journal of Forecasting, Month Unknown 1990, 11 pages, vol. 6, Issue 1, Elsevier Science Publishers B.V.
Zhang, Xuehai, et al., "A Performance Study of Monitoring and Information Services for Distributed Systems," Proceedings of the 12th IEEE International Symposium on High Performance Distributed Computing, Jun. 22-24, 2003, 12 pages, IEEE Computer Society, Washington, D.C., USA.

\* cited by examiner

Original set of DNS clusters

Updated set of DNS clusters

Original set of DNS clusters

Updated set of DNS clusters

METHOD AND APPARATUS FOR ENHANCED CLIENT PERSISTENCE IN MULTI-SITE GSLB DEPLOYMENTS

In the field of accessing applications that operate partially or entirely on servers or other machines accessed over a network such as the Internet, a typical application access first involves a client device (e.g., a computer, smart phone, tablet device, etc.) sending a domain name system (DNS) request to a DNS server. In return, the client receives a DNS response that includes a list of one or more IP addresses where the application is hosted. The IP addresses may be specific addresses of servers hosting the application, but commonly are virtual IP (VIPs) addresses that the client can use to send data to a network address translation (NAT) system or load balancer that forwards the data to a specific server that runs the application.

The DNS server can use a simplistic scheme such as round robin to cycle through the list of available IP addresses. In practice and commercially however, a DNS server usually operates in conjunction with a global server load balancing (GSLB) solution. A GSLB solution ensures that the incoming client requests are load balanced amongst the available sites, domains, and IP addresses, based on more sophisticated criterion such as: site or server load, proximity of clients to servers, server availability, performance parameters of latency and response times, etc., and preferably preserves client-server persistence for client "stickiness." That is, ensuring that as much as possible, a particular client gets assigned to the same server that runs the application each time the client connects.

GSLB solutions manage this across geographically distributed sites for fault tolerance and scale and most commonly client migration. In client migration, clients may move across several sites, owing to physical migration, perceived migration (e.g., owing to better connectivity), failover scenarios, or perhaps even a suspend-resume sequence. To provide a seamless application access experience, or perhaps for conformance, it is necessary to affine (preserve the parallel relationship for) the client's access to a specific site, domain, and server—this is client persistency. Given the potential migration of clients, it becomes important to maintain consistent client persistency information across these geographically disparate sites.

An application can be accessed by millions of clients across hundreds or thousands of sites. This scale poses challenges on the volume of information and also the time within which this information is needed to be exchanged between sites. In the prior art, persistence information stored at GSLB sites might include which IP or VIP address that was assigned to each client that had previously connected through the GSLB to the servers that run the application. However, in order to use this information in a timely way, in the prior art, a persistence entry for each client that accessed the GSLB system, identifying the client and its assigned VIP, had to be kept at each GSLB site. That is, the one GSLB site at which a DNS request for a new client was received, and a VIP assigned to the client, had to distribute a persistence entry for that client to every other GSLB site, in case a future DNS request from the client was received at one of the other GSLB sites. In a system with 10 million clients and 1,000 sites, that would mean that approximately 10 billion copies of persistence entries would have to be distributed throughout the system initially for the 10 million clients. Then the GSLB system would have to send a further 1,000 copies of a new persistence entry, to update the persistence tables for every GSLB site, whenever network conditions rendered an existing persistence entry obsolete (e.g., due to server crashes, etc.). Therefore, there is a need in the art for enhanced client persistence information handling methods.

BRIEF SUMMARY

The method of the present invention solves the problems caused by the DNS servers at every GSLB site in a GSLB system having to have persistence tables for any client DNS request they receive. Rather than storing every persistence entry at every GSLB site, some embodiments of the present invention assign each client a home DNS server cluster (e.g., a cluster of DNS servers at a particular data center in the GSLB system). Any DNS server cluster, referred to as "DNS clusters" herein, which receives a DNS request from a particular client, is able to identify what the home DNS cluster for that client is. The first DNS cluster then forwards the DNS request to the home DNS cluster.

When the forwarded DNS request reaches the home DNS cluster, the home DNS cluster checks a local persistence table and if a client identifier (e.g., IP address, MAC address, etc.) is not found in the persistence table, the GSLB system of the home DNS cluster (e.g., load balancers of the datacenter) assigns a VIP address to the client. The assigned VIP address is then sent to the client, and the home DNS cluster stores a persistence entry for the client in the local persistence table. Because any future DNS requests from the same client will also be routed to the home DNS cluster, there is no need for any other DNS cluster to receive a copy of the persistence entry, other than for backing up the local persistence table. In some embodiments, when the client sends data messages to the assigned VIP address, a NAT or load balancer associated with that VIP address ensures that the client gets assigned to the same server each time (e.g., a particular server in a pool of servers associated with that VIP address).

Some embodiments provide a method that, at a first DNS cluster of a set of DNS clusters, receives a DNS request from a client. The first DNS cluster identifies, based on an identifier of the client in the DNS request, a home DNS cluster of the client. The method forwards the DNS request to the home DNS cluster. The home DNS cluster supplies a DNS response to the client.

Identifying the home DNS cluster, in some embodiments, includes performing a hash on the identifier of the client. Supplying the DNS response, in some embodiments, includes receiving a virtual IP (VIP) address associated with one of a plurality of sets of application servers to the client and providing the received VIP address to the client in the DNS response. In some embodiments, receiving the VIP address includes receiving the VIP address from a load balancer that selects the VIP address from a set of VIP addresses, each VIP address associated with a set of application servers.

The supplied VIP address, in some embodiments, is a VIP address of a load balancer or a network address translation (NAT) engine that (1) assigns, to the client, an IP address of an application server in the set of application servers associated with the VIP address, and (2) creates a record that associates the IP address with the client.

The method of some embodiments further includes creating, in a persistence table of the home DNS cluster, an entry associating the VIP address with the client. In some embodiments, a second DNS request is received from the same client at a second DNS cluster (that is also not the home DNS cluster) of the set of DNS clusters. Upon receiving the second DNS request from the client, the second DNS cluster (1) identifies (based on the identifier of the client in the DNS request) the home DNS cluster of the client in the set of DNS clusters, and (2) forwards the second DNS request to the home DNS cluster. The home DNS cluster supplies, to the client, a second DNS response that includes the supplied VIP address. Supplying the second DNS response, in some embodiments, includes finding, based on the client identifier, the entry in the persistence table of the home DNS cluster. Finding the entry in the persistence table may include applying a counting bloom filter and bloom collision hash to the identifier.

The home DNS cluster, in some embodiments, is a home DNS cluster to multiple clients. The persistence table includes a persistence table entry for each of those clients. The method, in some embodiments, further includes (1) assigning a set of backup home DNS clusters to the home DNS cluster, and (2) backing up the persistence table of the home DNS cluster with each DNS cluster in the set of backup home DNS clusters. Each DNS cluster in the set of DNS clusters, in some embodiments, is a home DNS cluster to a plurality of clients, and each DNS cluster maintains a persistence table for that DNS cluster's clients and clients of a set of DNS clusters that that DNS cluster is assigned as a backup home DNS cluster for.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
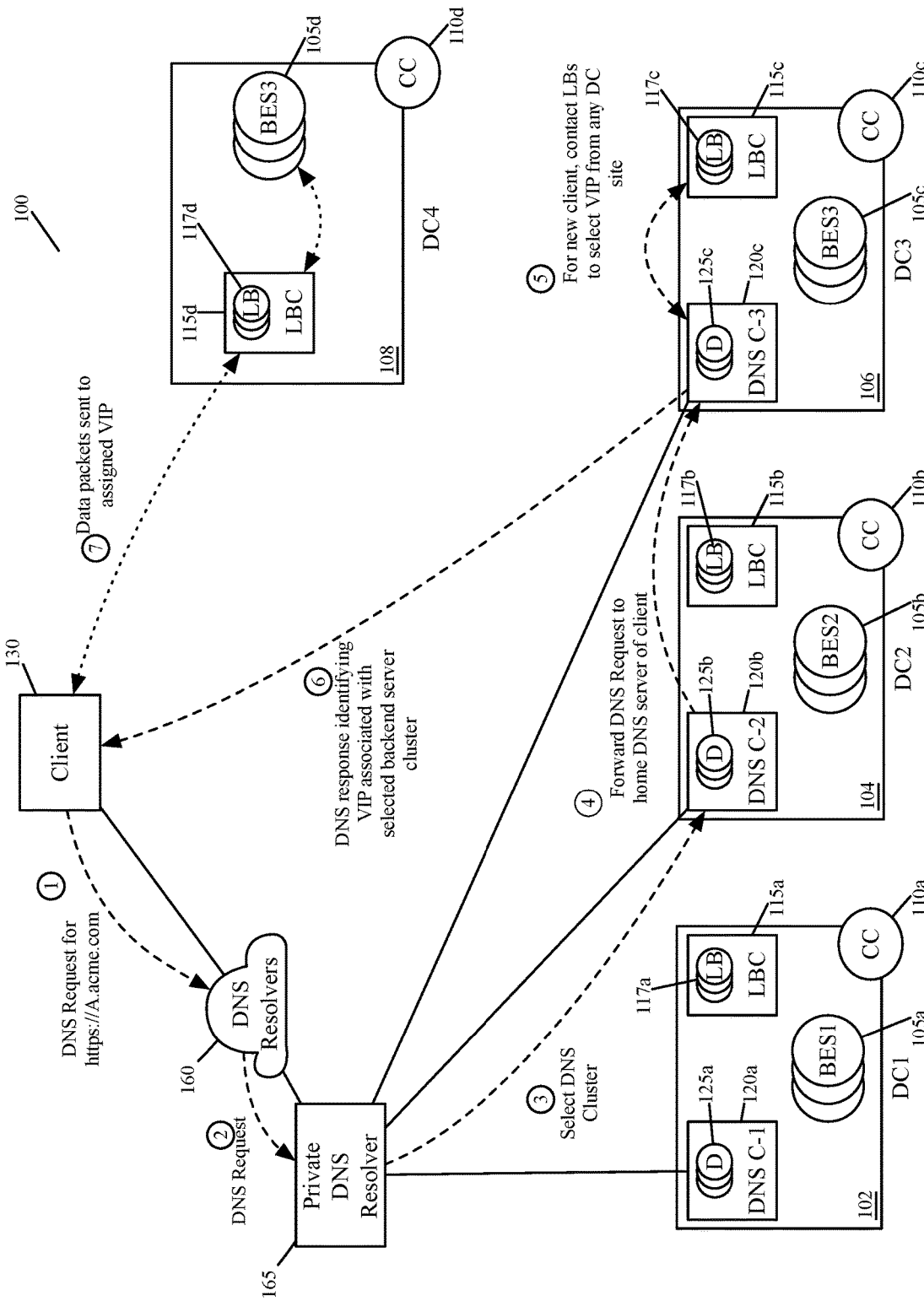
FIG. 1 illustrates an example of a GSLB system that uses the home DNS cluster method of some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

The method of the present invention solves the problems caused by the DNS servers at every GSLB site in a GSLB system having to have persistence tables for any client DNS request they receive. Rather than storing every persistence entry at every GSLB site, some embodiments of the present invention assign each client a home DNS cluster (e.g., a cluster at a particular data center in the GSLB system). Any DNS cluster that receives a DNS request from a particular client is able to identify what the home DNS cluster for that client is. The first DNS cluster then forwards the DNS request to the home DNS cluster.

When the forwarded DNS request reaches the home DNS cluster, the home DNS cluster checks a local persistence table and if a client identifier (e.g., IP address, MAC address, etc.) is not found in the persistence table, the GSLB system of the home DNS cluster (e.g., load balancers of the datacenter) assigns a VIP address to the client. The assigned VIP address is then sent to the client and the home DNS cluster stores a persistence entry for the client in the local persistence table. Because any future DNS requests from the same client will also be routed to the home DNS cluster, there is no need for any other DNS cluster to receive a copy of the persistence entry, other than for backing up the local persistence table. In some embodiments, when the client sends data messages to the assigned VIP address, a NAT or load balancer associated with that VIP address ensures that the client gets assigned to the same server each time (e.g., a particular server in a pool of servers associated with that VIP address).

Some embodiments provide a method that, at a first DNS cluster of a set of DNS clusters, receives a DNS request from a client. The first DNS cluster identifies, based on an identifier of the client in the DNS request, a home DNS cluster of the client. The method forwards the DNS request to the home DNS cluster. The home DNS cluster supplies a DNS response to the client.

Identifying the home DNS cluster, in some embodiments, includes performing a hash on the identifier of the client. Supplying the DNS response, in some embodiments, includes receiving a VIP address associated with one of a plurality of sets of application servers to the client and providing the received VIP address to the client in the DNS response. In some embodiments, receiving the VIP address includes receiving the VIP address from a load balancer that selects the VIP address from a set of VIP addresses, each VIP address associated with a set of application servers.

The supplied VIP address, in some embodiments, is a VIP address of a load balancer or a NAT engine that (1) assigns, to the client, an IP address of an application server in the set of application servers associated with the VIP address, and (2) creates a record that associates the IP address with the client.

The method of some embodiments further includes creating, in a persistence table of the home DNS cluster, an entry associating the VIP address with the client. In some embodiments, a second DNS request is received from the same client at a second DNS cluster (that is also not the home DNS cluster) of the set of DNS clusters. Upon receiving the second DNS request from the client, the second DNS cluster (1) identifies, based on the identifier of the client in the DNS request, the home DNS cluster of the client in the set of DNS clusters and (2) forwards the second DNS request to the home DNS cluster. The home DNS cluster supplies, to the client, a second DNS response that includes the supplied VIP address. Supplying the second DNS response, in some embodiments, includes finding, based on the client identifier, the entry in the persistence table of the home DNS cluster. Finding the entry in the persistence table may include applying a counting bloom filter and bloom collision hash to the identifier.

The home DNS cluster, in some embodiments, is a home DNS cluster to multiple clients. The persistence table includes a persistence table entry for each of those clients. The method, in some embodiments, further includes (1) assigning a set of backup home DNS clusters to the home DNS cluster, and (2) backing up the persistence table of the home DNS cluster with each DNS cluster in the set of backup home DNS clusters. Each DNS cluster in the set of DNS clusters, in some embodiments, is a home DNS cluster to a plurality of clients, and each DNS cluster maintains a persistence table for that DNS cluster's clients and clients of a set of DNS clusters that that DNS cluster is assigned as a backup home DNS cluster for.

FIG. 1 illustrates an example of a GSLB system 100 that uses the home DNS cluster method of some embodiments of the invention. In this example, backend application servers 105a-d are deployed in four datacenters 102-108. In some embodiments, one or more of these datacenters 102-108 may be either public datacenters or private datacenters. The datacenters 102-108 in this example are in different geographical sites (e.g., different neighborhoods, different cities, different states, different countries, etc.).

A cluster of one or more controllers 110 are deployed in each datacenter 102-108. Each datacenter 102-108 also has a cluster 115 of load balancers 117 to distribute the client load across the backend application servers 105 in the datacenter. In this example, the datacenters 102-106 also have a cluster 120 of DNS service engines 125 to perform DNS operations to process, e.g., to provide network addresses for domain names provided in the DNS requests submitted by clients 130 inside or outside of the datacenters 102-106. In some embodiments, the DNS requests include requests for fully qualified domain name (FQDN) address resolutions. Although datacenters 102-106 all include DNS service engines 125, in some embodiments, datacenters such as 108 may include backend servers 105, load balancers 117, or other elements for assigning a client to a particular backend server 105 but not include DNS service engines 125. Although several embodiments are described herein as including backend servers 105, in some embodiments, the applications run partially or entirely on other kinds of servers. One of ordinary skill in the art will understand that the inventions herein apply regardless of what kind of server(s) run the application. In general, servers that run at least some part of the application may be referred to as "application servers".

FIG. 1 illustrates the resolution of an FQDN that refers to a particular application "A" that is executed by the servers of the domain acme.com. As shown, this application is accessed through https and the URL "A.acme.com". The DNS request for this application is resolved in four steps. First, a public DNS resolver 160 initially receives the DNS request and forwards this request to the private DNS resolver 165 of the enterprise that owns or manages the private datacenters 102-106.

Second, the private DNS resolver 165 selects one of the DNS clusters 120. This selection is random in some embodiments, while in other embodiments it is based on a set of load balancing criteria that distributes the DNS request load across the DNS clusters 120. In still other embodiments, the private DNS resolver 165 selects a home DNS for the client 130 (e.g., using a hash of an identifier of the client). In the example illustrated in FIG. 1, the private DNS resolver 165 selects the DNS cluster 120b of the datacenter 104 at random.

Third, the selected DNS cluster 120b resolves the domain name to an IP address. In some embodiments, each DNS cluster 120 includes multiple DNS service engines 125, such as DNS service virtual machines (SVMs) that execute on host computers in the cluster's datacenter. When a DNS cluster 120 receives a DNS request, a frontend load balancer (not shown) in some embodiments selects a DNS service engine 125 in the cluster 120 to respond to the DNS request, and forwards the DNS request to the selected DNS service engine 125. Other embodiments do not use a frontend load balancer, and instead have a DNS service engine serve as a frontend load balancer that selects itself or another DNS service engine in the same cluster for processing the DNS request.

Fourth, the DNS service engine 125b that processes the DNS request then determines (See, e.g., in FIG. 3, below) an identity of a home DNS cluster 120c, of FIG. 1, for the client 130. A service engine 125c of the DNS cluster 120c (the home DNS cluster for the client 130) then determines whether the client 130 has previously sent a DNS request and been assigned a VIP, at a datacenter that executes application "A", in a DNS response. In some embodiments, this determination involves looking up a client identifier in a persistence table (not shown) of the DNS cluster 125c. See, e.g., FIG. 5. If the client identifier is not found in the persistence table of the DNS cluster, then the DNS service engine 125c, in some embodiments, contacts the load balancer 115c, which uses a set of criteria to select a VIP from among the VIPs at all datacenters that execute the application. The set of criteria for this selection, in some embodiments, includes: (1) the number of clients currently assigned to use various VIPs, (2) the number of clients using the VIPs at the time, (3) data about the burden on the backend servers accessible through the VIPs, (4) geographical or network locations of the client and/or the datacenters associated with different VIPs, etc. Also, in some embodiments, the set of criteria include load balancing criteria that the DNS service engines use to distribute the data message load on backend servers that execute application "A."

In the example illustrated in FIG. 1, the selected backend server cluster is the server cluster 105d in the datacenter 108. After selecting this backend server cluster 105d for the DNS request that it receives, the DNS service engine 125c of the DNS cluster 120c returns a DNS response to the requesting client 130. As shown, this response includes the VIP address associated with the selected backend server cluster 105d. In some embodiments, this VIP address is associated with the local load balancer cluster 115d that is in the same datacenter 108 as the selected backend server cluster 105d. Although in this example, the backend server cluster 105d is in a datacenter 108 without a DNS cluster of its own, other clients (not shown) of the embodiment of FIG. 1 are assigned to backend server clusters 105a, 105b, or 105c that include DNS clusters 120a, 120b, and 120c, respectively.

After getting the VIP address, the client 130 sends one or more data message flows to the assigned VIP address for the backend server cluster 105d to process. In this example, the data message flows are received by the local load balancer cluster 115d and forwarded to one of the backend servers 105d. In some embodiments, each load balancer cluster 115 has multiple load balancing service engines 117 (e.g., load balancing SVMs) that execute on host computers in the cluster's datacenter.

When the load balancer cluster 115 receives the first data message of the flow, a frontend load balancer (not shown) in some embodiments selects a load balancing service engine 117 in the cluster 115 to select a backend server 105 to receive the data message flow and forwards the data message to the selected load balancing service engine 117. Other embodiments do not use a frontend load balancer, and instead have a load balancing service engine in the cluster serve as a frontend load balancer that selects itself or another load balancing service engine in the same cluster for processing the received data message flow.

When a selected load balancing service engine 117 processes the first data message of the flow, in some embodiments, this load balancing service engine 117 uses a set of load balancing criteria (e.g., a set of weight values) to select one backend server from the cluster of backend servers 105 in the same datacenter 106. The load balancing service engine 117 then replaces the VIP address with an actual destination IP (DIP) address of the selected backend server (e.g., among servers 105) and forwards the data message and subsequent data messages of the same flow to the selected backend server. The selected backend server then processes the data message flow, and when necessary, sends a responsive data message flow to the client 130. In some embodiments, the responsive data message flow is sent through the load balancing service engine 117 that selected the backend server for the initial data message flow from the client 130.

In some embodiments, a load balancer cluster 115 maintains records of which server each client has previously been assigned to and when later data messages from the same client are received, the load balancer cluster 115 forwards the messages to the same server. In other embodiments, data messages sent to the VIP address are received by a NAT engine that translates the VIP address into an internal address of a specific backend server. In some such embodiments, the NAT engine maintains records of which server each client is assigned to and sends further messages from that client to the same server. In some embodiments, the NAT engine may be implemented as part of the load balancer cluster 115.

The controllers 110 facilitate the operations of the DNS system that the GSLB system 100 performs in some embodiments. The controllers 110 may receive system messages to alter the algorithms (e.g., hash formulas) used in some embodiments to determine the home DNS for each client, facilitate selection of backup home DNS clusters, etc. Similarly, in some embodiments, the controllers 110 generate and update hash wheels that associate specific DNS clusters 120 with specific clients. Such hash wheels are described with respect to FIG. 3, below.

Figure 2:
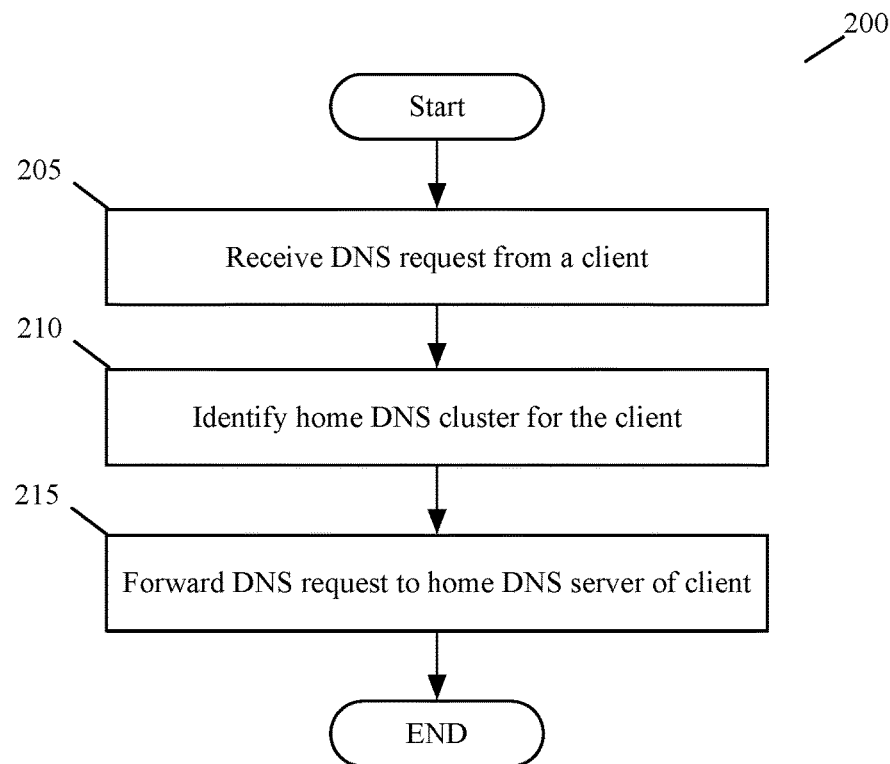
FIG. 2 conceptually illustrates a process of some embodiments for selecting a home DNS cluster to send a DNS reply to a client.
Figure 3:
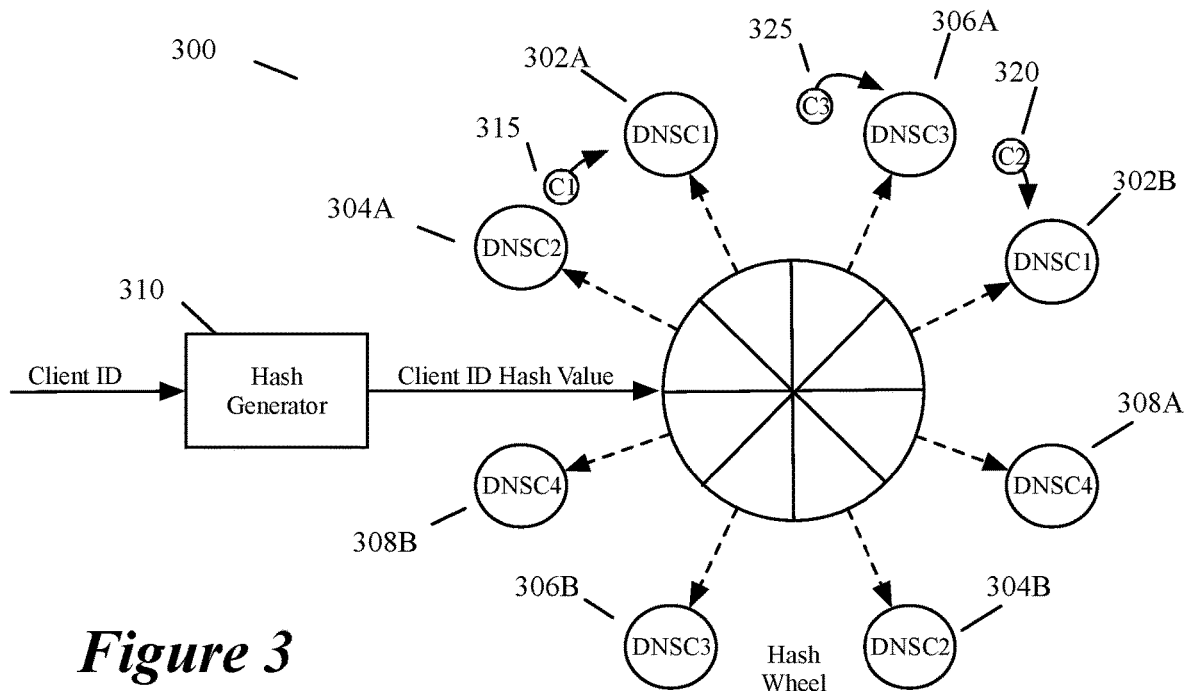
FIG. 3 illustrates an example of a hash wheel.

FIG. 2 conceptually illustrates a process 200 of some embodiments for selecting a home DNS cluster to send a DNS reply to a client. Details about one of the operations of FIG. 2 will be described in relation to FIG. 3. FIG. 3 illustrates an example of a hash wheel 300 performing a consistent hash. Process 200, of FIG. 2, begins by receiving (at 205) a DNS request from a client. In some embodiments, the process 200 is implemented by a receiving DNS cluster of a datacenter (e.g., DNS cluster 120 of FIG. 1).

The process 200, of FIG. 2, then identifies (at 210) a home DNS cluster for the client. In some embodiments, this determination is based on a client identifier (client ID) of the client. The client ID in some embodiments may be any data regarding the client in the DNS request. For example, the client ID may be a source IP address, source IP and port addresses, MAC address of the client, or any other client identifying data or combination of data.

In some embodiments, the process 200 identifies the home DNS cluster by performing a consistent hash. In a consistent hash of DNS clusters and clients, a hash is applied to an identifier of each DNS cluster (e.g., an IP address of the DNS cluster, etc.). The hash maps each DNS cluster to a particular value that may be conceptualized as an "angle" around a (conceptual) circle, the value is sometimes referred to as a "slot." The resulting set of DNS clusters and their associated values is referred to herein as a "hash wheel." One of ordinary skill in the art will understand that the angles in some embodiments do not need to be a range used in any standard system for defining angles on a circle, but that any hash that maps identifiers to any defined range of values may be used in some embodiments.

In some embodiments, each DNS cluster is supplied with a list or database identifying the DNS clusters in the GSLB system and a value (e.g., an IP address) to apply a specified hash function to. In other embodiments, the hash wheel is calculated at one location (e.g., a network controller, etc.) then the resulting hash wheel is distributed to each DNS cluster. To assign a client to a home DNS cluster, in some embodiments, the DNS cluster performs a hash on the client ID to map the client ID to a value (e.g., an angle on the hash wheel). The hashed values of the client IDs are sometimes called "keys." In some embodiments, the hash performed on the client ID is the same hash used on the DNS cluster IDs. In other embodiments, the hash performed on the client ID is a different hash used on the DNS cluster IDs that maps to the same range of angles. After the client ID is mapped to a hash wheel value, the client is then assigned to the DNS cluster that occupies the next slot around the hash wheel in a particular direction (e.g., clockwise or counter-clockwise). In some embodiments, each DNS cluster is associated with multiple slots (e.g., 2, 3, 4, etc.).

As mentioned, FIG. 3 illustrates an example of a hash wheel 300. As shown, this wheel 300 has several different ranges of hash values, with each range associated with one of eight different DNS cluster slots 302A-308B, representing four different DNS clusters (DNSC1-DNSC4). FIG. 3 also includes three hashed client IDs 315-325. In the embodiment of FIG. 3, the consistent hash is implemented to produce two slots (angles around the hash wheel) for each DNS cluster in the GSLB.

In some embodiments, the controllers 110, of FIG. 1, provide each DNS cluster 120 with a copy of this hash wheel 300, and a hash function to be applied by a hash generator 310, of FIG. 3. For each client that sends a DNS request, the receiving DNS cluster, in some embodiments, (1) uses the hash generator 310 to generate a hash value from the client ID, and (2) identifies the next DNS cluster (in the preselected direction) as the home DNS cluster for that client. In FIG. 3, the preselected direction is clockwise. In other embodiments, the preselected direction could be counter-clockwise, or if the values are not conceptualized as a wheel, the preselected direction could be "greater" or "lesser."

The three hashed client IDs 315-325 represent the hashed values of the client IDs of three different clients. Each has been hashed to a value on the hash wheel 300. Hashed client ID 315, representing client C1 has been mapped to a value closest to DNS cluster slot 304A, however, in this embodiment, each client is assigned to the DNS cluster that has the next slot in a clockwise direction.

For hashed client ID 315, associated with client C1, the next slot in the clockwise direction is DNS cluster slot 302A, therefore client C1 will be assigned to DNS cluster DNSC1. For hashed client ID 320, associated with client C2, the next slot in the clockwise direction is DNS cluster slot 302B. Slot 302B is the second slot associated with DNS cluster DNSC1, therefore client C2 will also be assigned to DNS cluster DNSC1. Similarly, client C3, associated with hashed client ID 325 has DNS cluster slot 306A as the next slot clockwise of the hashed client ID. Although the embodiment illustrated in FIG. 3 uses a wheel of hash values for purposes of explanation, the hash values in some embodiments are merely applied cyclically. That is, if there is no DNS cluster slot between a hashed client ID and the extreme end of the range of values in the preselected direction, the client will be assigned to the DNS cluster associated with the DNS cluster slot closest to the other extreme end of the range of values.

After identifying the home DNS cluster, the receiving DNS cluster, in some embodiments then performs the next operation of process 200 by forwarding (at 215) the DNS request to the identified home DNS cluster. In some embodiments, the hash is performed by an individual DNS service engine of the receiving DNS cluster. In other embodiments, the receiving DNS cluster includes a separate module or set of software instructions that performs all hashing operations for the DNS cluster. The process 200 then ends.

Figure 4:
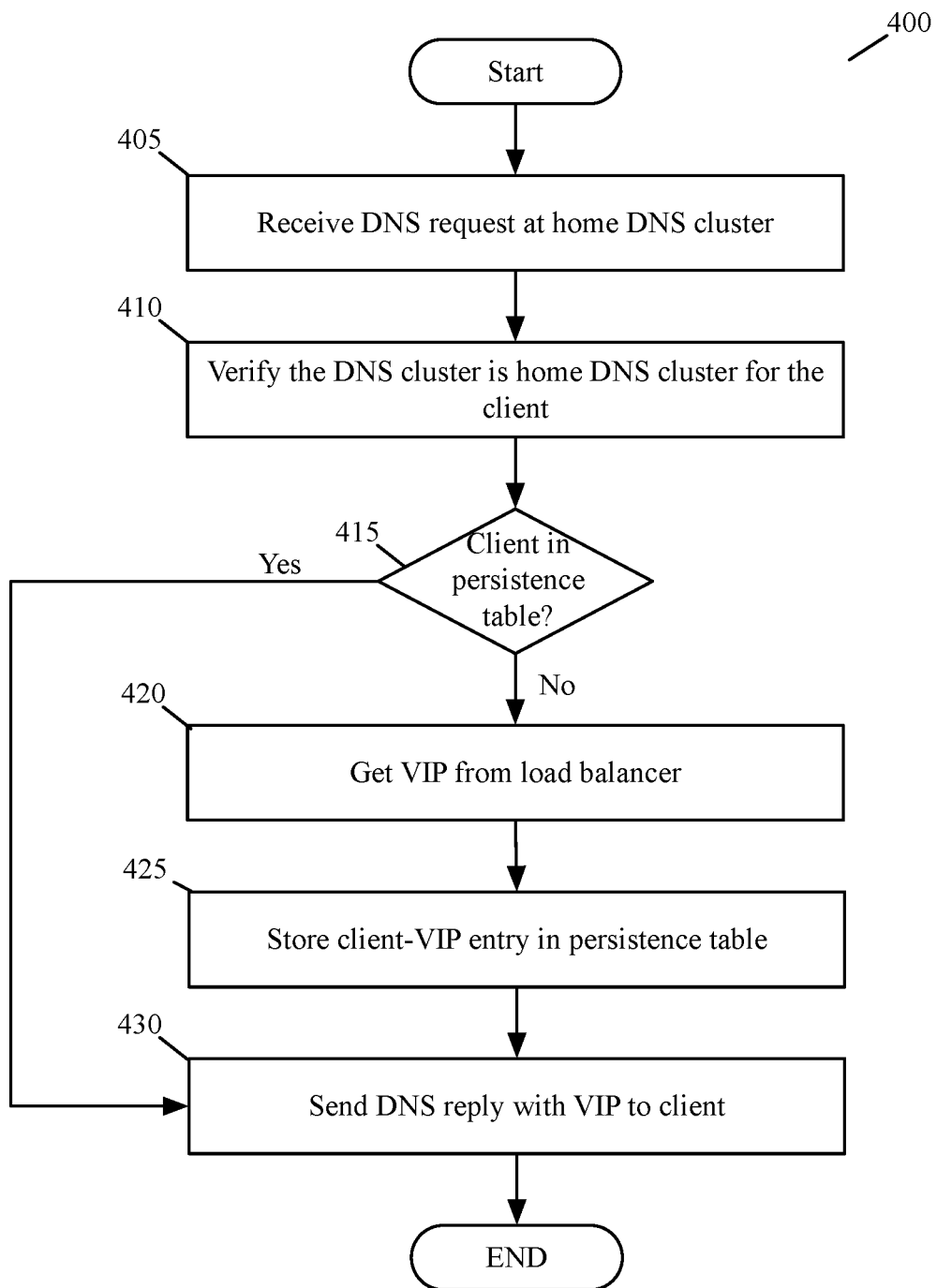
FIG. 4 conceptually illustrates a process of some embodiments for checking a persistence table to determine whether a client has previously been assigned a VIP.
Figure 5:
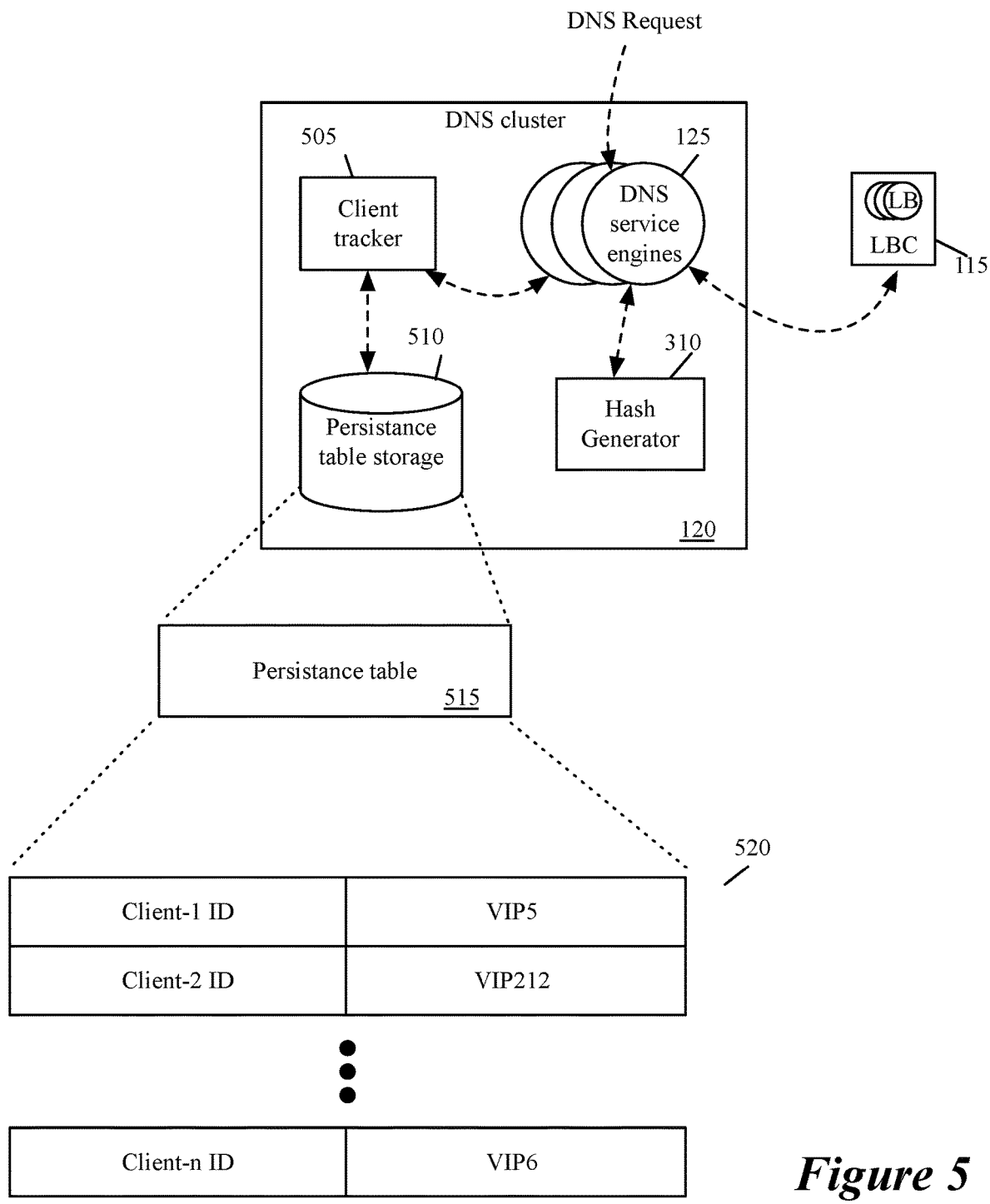
FIG. 5 illustrates a more detailed view of a DNS cluster.

As mentioned above, some DNS clusters use persistence tables to determine whether a client has previously been assigned a VIP. FIG. 4 conceptually illustrates a process 400 of some embodiments for checking a persistence table to determine whether a client has previously been assigned a VIP. The process 400 will be described with respect to FIG. 5. FIG. 5 illustrates a more detailed view of a DNS cluster 120. FIG. 5 includes DNS cluster 120 with service engines 125, a hash generator 310, a client tracker 505, and a persistence table storage 510. FIG. 5 also includes a load balancer cluster 115 and conceptually illustrates a persistence table 515 with persistence table entries 520.

The process 400, of FIG. 4, begins when the DNS cluster (e.g., DNS cluster 120 of FIG. 5) receives (at 405) a DNS request. In some embodiments, the DNS request is processed by one of the DNS service engines 125 (e.g., after being assigned to a particular DNS service engine by a frontend load balancer (not shown)). The process 400, of FIG. 4, then verifies (at 410) that the DNS cluster is the home DNS cluster of the client. In some embodiments, this verification is performed by sending the client ID to a hash generator (e.g., hash generator 310 of FIG. 5). In other embodiments, the DNS cluster verifies that it is the home DNS cluster by some other indication in the DNS request, such as a forwarding bit of the DNS request being sent by a DNS cluster that forwarded the DNS request to the home DNS cluster, or by the forwarding DNS cluster having modified the FQDN being requested to indicate a redirection (e.g., "foo.com" would be modified to an internal "site2.foo.com").

After verifying that the DNS cluster is the home DNS cluster of the client that sent the DNS request, the process 400, of FIG. 4, determines (at 415) whether the client ID is in the persistence table, e.g., by having a client tracker module 505, of FIG. 5, check the persistence table 515 stored in the persistence table storage 510 for an entry matching the client ID. Each of the entries 520 include a client ID paired with the VIP to which that client ID is assigned (e.g., a VIP supplied to the client in a DNS reply to a previous DNS request from that client). Multiple clients may be assigned to the same VIP in some embodiments.

In some embodiments, the persistence table storage 510, or some other storage (not shown) of the DNS cluster 120 also stores data for implementing a counting bloom filter and bloom collision hash to quickly determine whether the client ID is a new client ID. One of ordinary skill in the art will understand that a counting bloom filter and bloom collision hash can be used to quickly identify whether a client ID is possibly in the persistence table 515. For a counting bloom filter, false positives are possible. That is, client IDs can be identified by the counting bloom filter as possibly being in the persistence table when those client IDs are not actually in the persistence table. For a counting bloom filter, false negatives are not possible. That is, client IDs identified by a counting bloom filter as not in the persistence table are definitely not in the persistence table. The counting bloom filter and bloom collision hash are updated as each new client ID (and its assigned VIP) is added to the persistence table 515. In such embodiments, the client tracker 505 uses the counting bloom filter and bloom collision hash to determine whether a client ID is new (e.g., a DNS request from the client is not memorialized in the table) or may have a persistence table entry 520.

If the client ID is determined by the client tracker 505 to possibly have a persistence table entry (using the bloom filter) or if the embodiment doesn't use a bloom filter, then the client tracker 505 searches the persistence table 515 for an entry with that client ID. If an entry is not found (or in some embodiments, if the counting bloom filter indicates there is no entry for a client), the client tracker 505 notifies the DNS service engine 125. The process 400 then continues when the DNS cluster 120 gets (at 420) a VIP from the load balancer. In some embodiments, any VIP for a backend server in the GSLB system may be assigned to a client by the load balancer, including VIPs associated with different data centers than the home DNS cluster of the client or even VIPs associated with data centers that do not have DNS clusters. The process 400 then stores (at 425) the client-VIP pair in the persistence table storage (e.g., persistence table storage 510, of FIG. 5) and moves on to send (at 430) the DNS reply to the client including the VIP received from the load balancer. If a persistence table entry for the client is found (at 415) then the process 400 sends (at 430) a DNS reply including the VIP entry corresponding to that client ID to the client. The process 400 then ends.

As mentioned above, in the prior art, GSLB systems with persistence tables required every DNS cluster to store an entry for every client in the system. This meant that each DNS cluster in a prior art system with 10 million clients would have to store 10 million entries in its persistence table. With 1,000 DNS clusters, this would mean passing about 10 billion copies of entries between DNS clusters. In the present invention, with 10 million clients and 1,000 DNS clusters, the average number of clients per DNS cluster would be 10,000. Thus each DNS cluster would have 10,000 persistence table entries, on average, allowing faster lookup of the client IDs than searching a table with 10 million entries. However, if the home DNS cluster of a client in some embodiments became inaccessible, due to network issues, crashes of computers at a datacenter, etc., a DNS request from a client would not reach the home DNS cluster of the client.

To handle issues of unavailable DNS clusters, the DNS clusters of some embodiments each have one or more backup DNS clusters in the GSLB system. The persistence table of each DNS cluster is copied to the backup home DNS cluster or DNS clusters in such embodiments. Even in embodiments with several backup DNS clusters for each DNS cluster, the number of entries that need to be copied for the backups will be less than the number of entries copied in the prior art. For example, in the previously mentioned example with 10 million clients and 1,000 DNS clusters, backing up each DNS cluster on three separate backup home DNS clusters would only require copying 30 million entries (e.g., 10,000 entries for each of 1,000 DNS clusters copied to 3 backups) rather than the previously cited 10 billion. However, to increase the advantages of home DNS clusters over a system in which every DNS cluster maintains a persistence table entry for every previous client that received a VIP from the GSLB system, some embodiments use a small number of backups compared to the total number of DNS clusters. For example, some embodiments use fewer backups for each home DNS cluster than 1/10th the total number of DNS clusters. Other embodiments use fewer backups for each home DNS cluster than 1/2, or 1/3, or 1/4, etc., the total number of DNS clusters.

Figure 6:
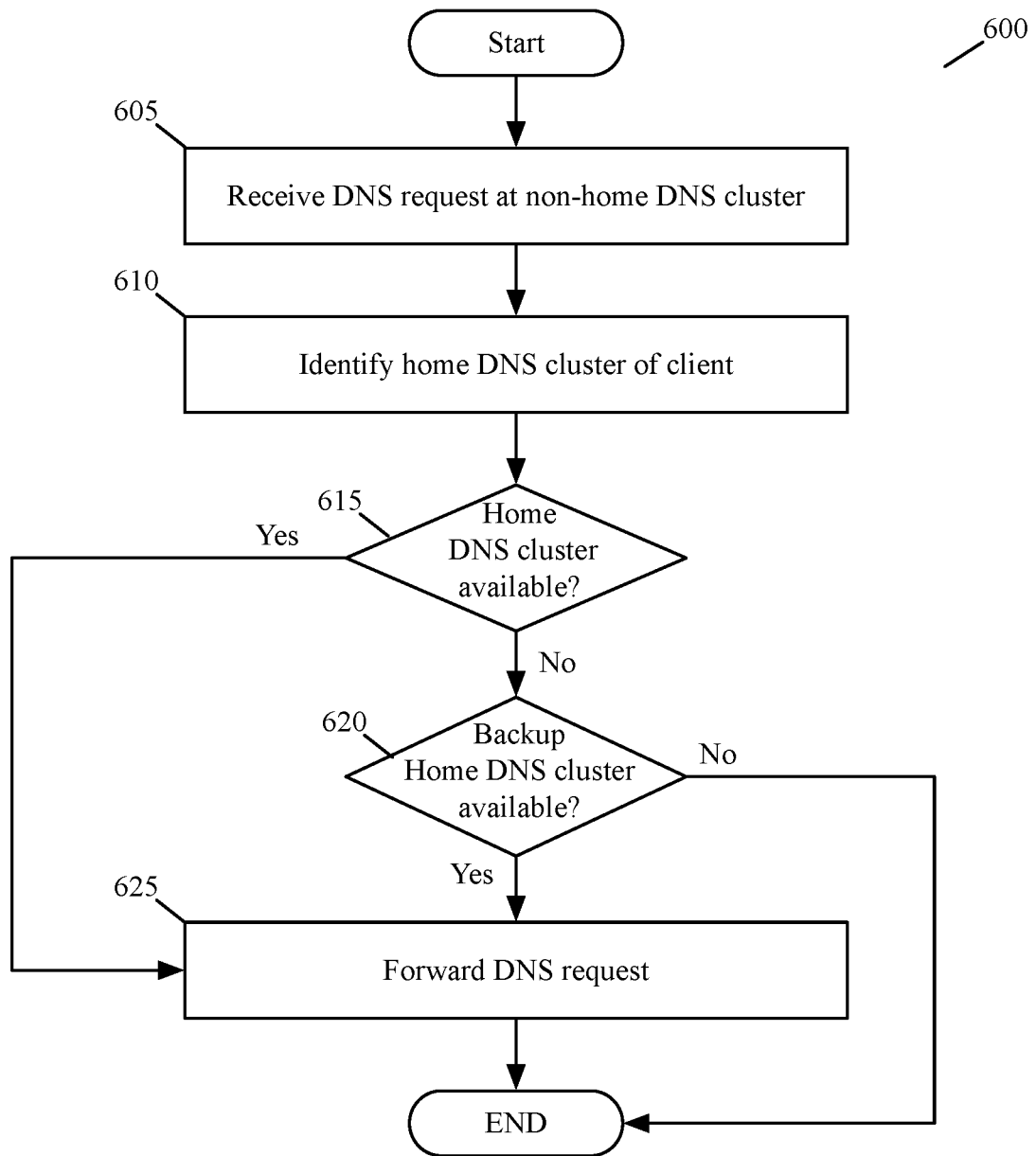
FIG. 6 conceptually illustrates a process of some embodiments for sending a DNS request to a home or backup home DNS cluster.

FIG. 6 conceptually illustrates a process 600 of some embodiments for sending a DNS request to a home or backup home DNS cluster. The process 600 receives (at 605) a DNS request from a client at a DNS cluster that is not the home DNS cluster of the client. In some embodiments, the process 600 is performed by that receiving (non-home) DNS cluster. The process 600 identifies (at 610) the home DNS cluster of the client (e.g., using a consistent hash). The process 600 then determines (at 615) whether the home DNS cluster of the client is available. In some embodiments, this determination is made by pinging the home DNS cluster, by checking a centralized or distributed list or database table of operational DNS clusters, etc. If the home DNS cluster of the client is available, the process 600 forwards (at 625) the DNS request to the home DNS cluster and the process 600 ends.

If the home DNS cluster is not available (at 615) then the process 600 determines whether a backup home DNS cluster for the client is available. In some embodiments, the backup home DNS clusters for a particular home DNS cluster are determined by performing another hash operation on the client ID or an ID of the home DNS. In other embodiments, the backup home DNS clusters for each home DNS cluster in the system may be stored in a list or database table associating each DNS cluster in the system with its backup DNS clusters, etc. If a backup home DNS cluster for the client is available, the process 600 forwards (at 625) the DNS request to the backup home DNS cluster and the process 600 ends. If the process 600 determines (at 620) that there is no backup home DNS cluster, then the process 600 ends there. In some embodiments, if the process 600 is unable to identify an available backup home DNS cluster, then the DNS request is simply sent to the load balancers of the GSLB site of the receiving (non-home) DNS cluster and a VIP is provided. In some embodiments, this failsafe provision is performed without keeping track of the client-VIP pairing in a persistence table. In other embodiments, there is a system for tracking the client-VIP pairing and forwarding a persistence entry for that pairing to the home DNS cluster when it becomes accessible again.

In some embodiments, both the addition and removal of a GSLB site are infrequent and involved operations. Some embodiments implement a "pre-provisioning phase" before the addition or removal of GSLB sites. Any addition or removal of GSLB sites (and their DNS clusters) modifies the consistent hash ring. This affects the client-to-home DNS cluster mapping of the hash. The "pre-provisioning phase" iterates through all the entries in the persistence tables at all the GSLB sites and repatriates them to the new "home DNS clusters" in accordance with the updated consistent hash ring. Once the "pre-provisioning phase" is complete, a coordinated toggle from the topology that uses the previous set of GSLB sites to the topology that uses the updated set of GSLB sites is orchestrated, which ensures minimal disruption.

Figure 7:
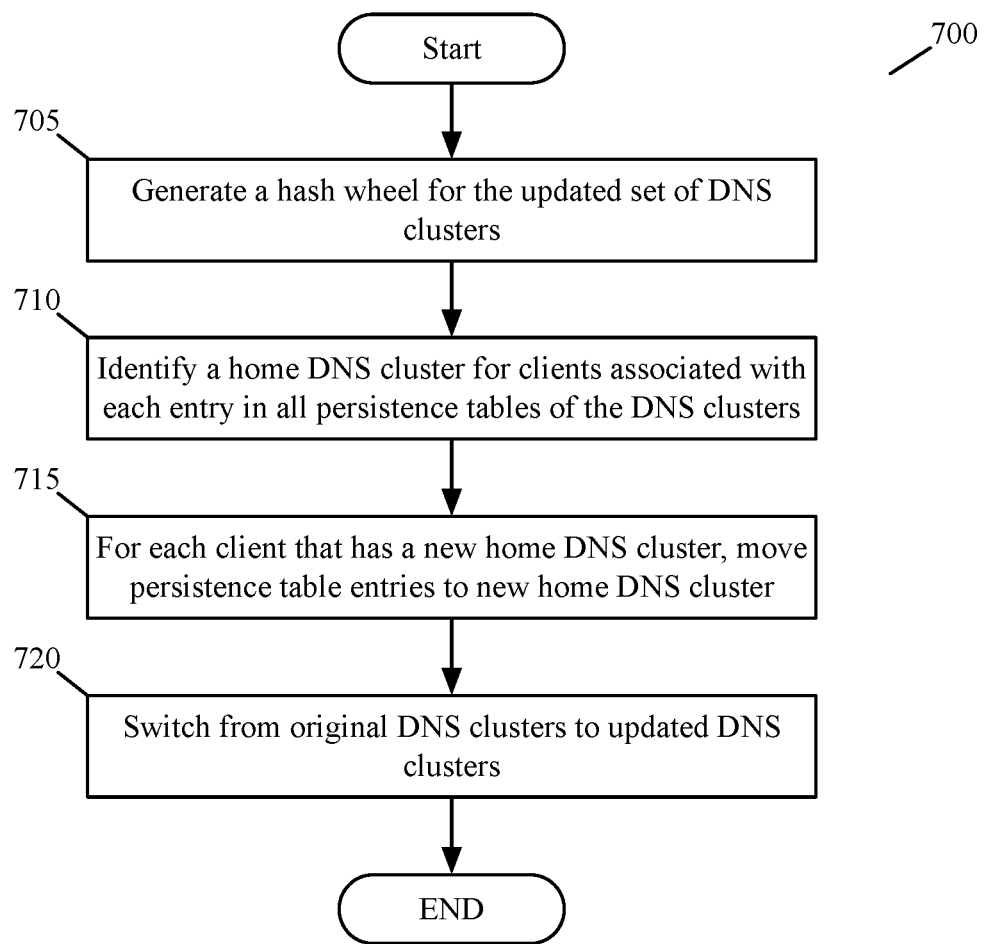
FIG. 7 conceptually illustrates a process of some embodiments for pre-provisioning an updated set of GSLB sites.

FIG. 7 conceptually illustrates a process 700 of some embodiments for pre-provisioning an updated set of GSLB sites. The process 700 re-allocates persistence table entries from a set of DNS server clusters (DNS clusters) to an updated set of DNS clusters. Until the last step of the process 700, both the DNS clusters of the original set and any DNS clusters being added in the updated set will be operating within the GSLB system. The process 700 generates (at 705) a hash wheel for the updated set of DNS clusters. In some embodiments, the hash wheel is generated using the same consistent hash algorithm used to generate the hash wheel of the original set of DNS clusters. In such embodiments, the only persistence table entries that will need to be copied to different DNS clusters in the updated set of DNS clusters are entries from DNS clusters that are being removed by the update (See, e.g., FIG. 8) and entries where added DNS clusters pre-empt, for at least some clients, DNS clusters from the original set that are remaining in the updated set (See, e.g., FIG. 9).

The process 700 identifies (at 710) a home DNS cluster for each client associated with an entry in a persistence table in any DNS cluster currently in the GSLB system. The process 700 of some embodiments identifies the home DNS cluster for each client associated with a persistence table entry by applying the hash algorithm (e.g., the hash algorithm previously used to allocate clients to the current set of DNS clusters) to the client identifier in the entry and distributing the clients based on the new hash wheel (generated in operation 705). The process 700, for each client that has a new home DNS cluster, moves (at 715) the persistence table entries associated with the client to the new home DNS cluster. This prepares the new home DNS cluster for the updated GSLB setup. That is, after the updated set of DNS clusters replaces (in whole or in part) the original set of DNS clusters, a new DNS request from a client will be routed to the client's new home DNS cluster based on the new hash wheel. When the new DNS request arrives at the new home DNS cluster, a copy of the old persistence table entry for the client will be in the persistence table of the new home DNS cluster enabling the new home DNS cluster to provide the client with a DNS reply that assigns the same VIP to the client as the client had previously been assigned by the old home DNS cluster.

In some embodiments, moving the persistence table entries includes copying the persistence table entries that change home DNS clusters (as identified in operation 710) from the original home DNS clusters of the client associated with that entry to the new home DNS cluster of the client associated with that entry. Once all of the persistence table entries that need to be moved are copied to their new home DNS clusters, the process 700 switches (at 720) from the original DNS clusters to the updated DNS clusters (e.g., removes from the GSLB system any DNS clusters that are not part of the updated set of DNS clusters). The process 700 then ends.

As mentioned above, the persistence table entry for a client is moved only when the client will be assigned to a new home DNS cluster in the updated set of DNS clusters. The client will be assigned a new home DNS cluster when the old DNS cluster is being removed in the update or when a newly added DNS cluster is mapped, by the hash, to a value between the hashed value of the client ID and the client's old home DNS cluster.

Figure 8:
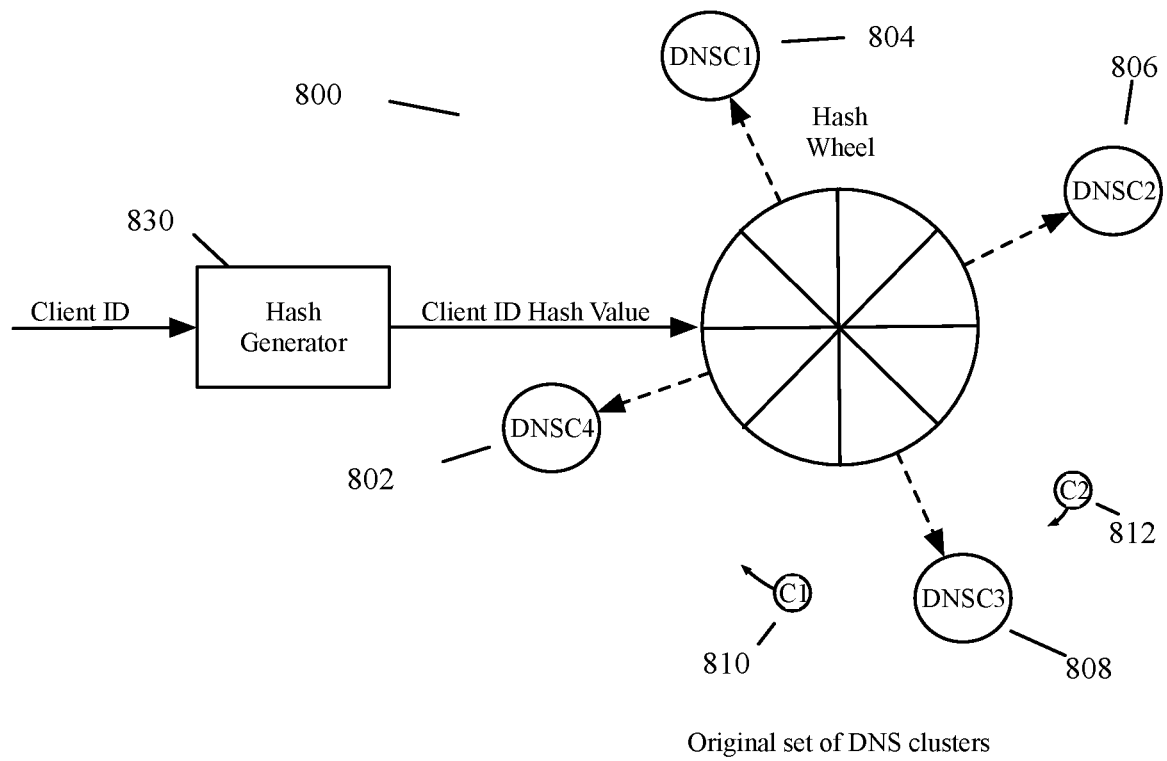
FIG. 8 conceptually illustrates an example of removing a DNS cluster from a set of DNS clusters.
Figure 8:
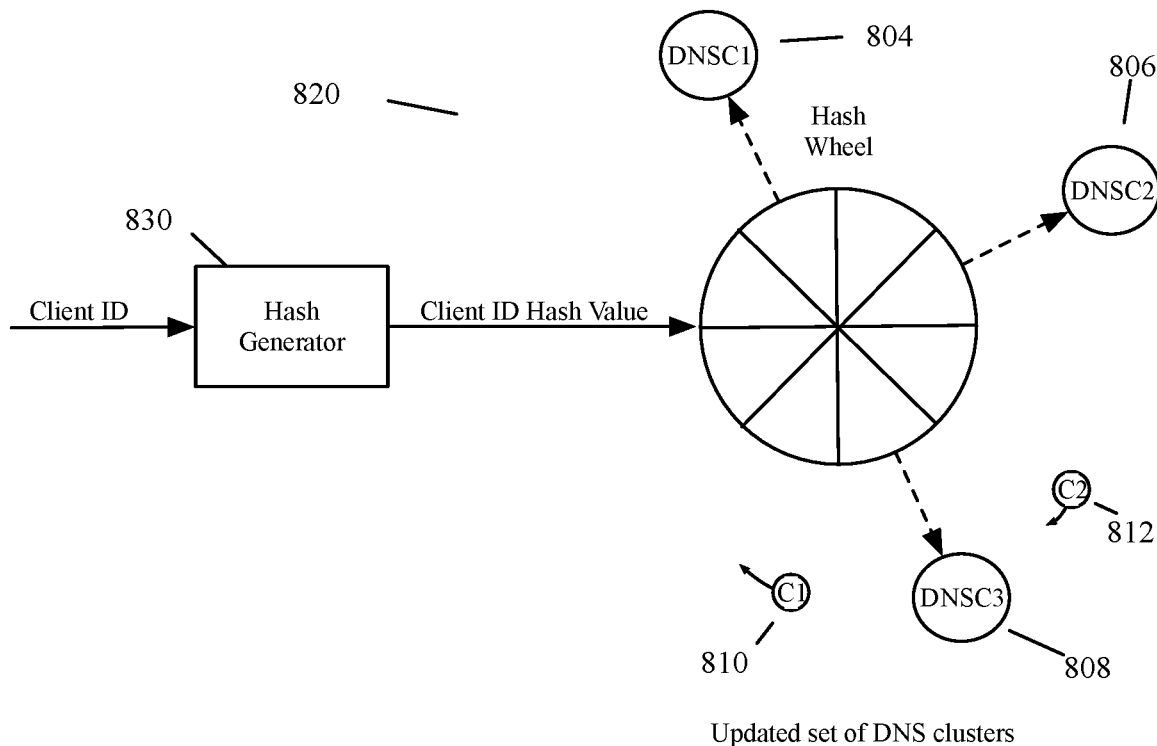

FIG. 8 conceptually illustrates an example of removing a DNS cluster from a set of DNS clusters. FIG. 8 includes a hash wheel 800 for an original set of DNS clusters that includes DNS cluster slots 802-808, hashed client IDs 810 and 812 associated with client C1 and client C2, respectively, and a hash wheel 820 for an updated set of DNS clusters that includes DNS cluster slots 804-808. A hash generator 830 performs hash operations on client IDs (e.g., client IDs of persistence table entries). In this embodiment, the client IDs 810 and 812 are still mapped to the same hash values on the original hash wheel 800 and the updated hash wheel 820, while the DNS clusters change. Based on the original hash wheel 800, client C1 is assigned DNS cluster DNSC4 (as its home DNS cluster), associated with DNS cluster slot 802, because DNS cluster slot 802 is the next DNS cluster slot in the clockwise direction from the value of hashed client ID 810. Also, based on the original hash wheel 800, client C2 is assigned DNS cluster DNSC3 (as its home DNS cluster), associated with DNS cluster slot 808, because DNS cluster slot 808 is the next DNS cluster slot in the clockwise direction from the value of hashed client ID 812.

In the updated set of DNS clusters, DNS cluster DNSC4 has been removed (e.g., for maintenance, re-assignment to be used with other applications, etc.). Accordingly, updated hash wheel 820 does not include DNS cluster slot 802, associated with DNS cluster DNSC4. Based on the updated hash wheel 820, client C1 is now assigned DNS cluster DNSC1, associated with DNS cluster slot 804, because DNS cluster slot 804 is the next DNS cluster slot in the clockwise direction from the value of hashed client ID 810. However, client C2 is still assigned to cluster DNSC3, associated with DNS cluster slot 808, because DNS cluster slot 808 is still the next DNS cluster slot in the clockwise direction from the value of hashed client ID 812 in the updated hash wheel 820.

In this example, before DNS cluster DNSC4 would be removed from the GSLB, all of the persistence table entries of any clients with DNS cluster DNSC4 as their home would be moved to the client's new home DNS cluster, DNS cluster DNSC1. However, the persistence table entry for clients of DNS cluster DNSC3 would not be moved from DNSC3 because DNSC3 remains the home of those clients. Although all of the persistence entries of DNS cluster DNSC4 would be moved to DNS cluster DNSC1, in the embodiment of FIG. 8, one of ordinary skill in the art will understand that in embodiments that assign multiple slots in the hash wheel to each DNS cluster, two clients previously assigned to the same DNS cluster could be assigned to different DNS clusters from each other after the update if the clients were assigned based on different DNS cluster slots associated with the same original DNS cluster and the next DNS cluster slot for each of the two different clients were associated with different DNS clusters.

Figure 9:
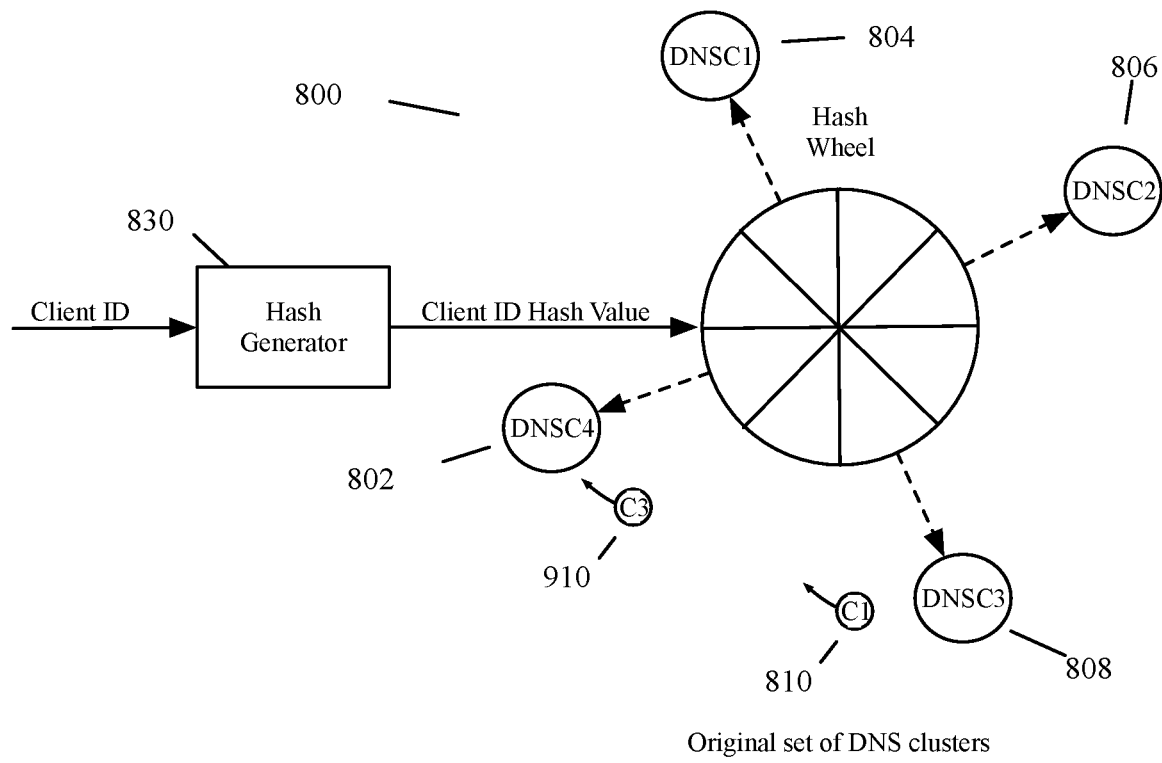
FIG. 9 conceptually illustrates an example of adding a DNS cluster to a set of DNS clusters.
Figure 9:
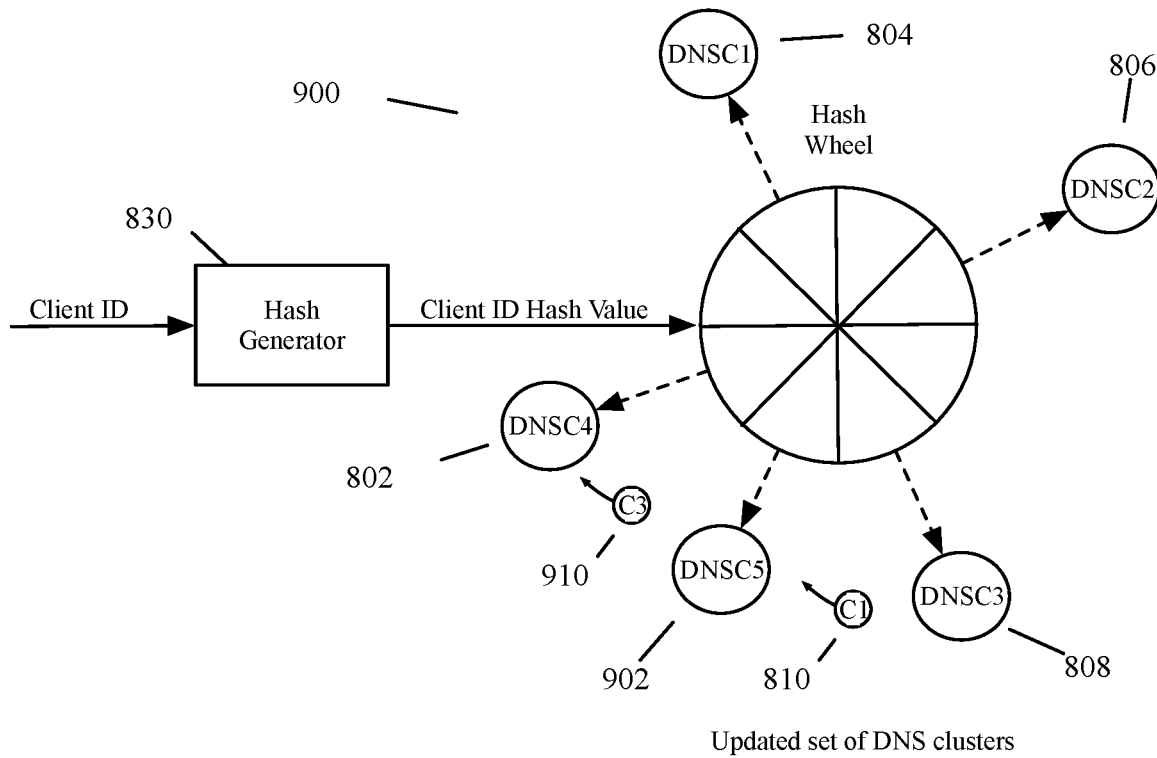

FIG. 9 conceptually illustrates an example of adding a DNS cluster to a set of DNS clusters. FIG. 9 includes hash wheel 800 for an original set of DNS clusters that includes DNS cluster slots 802-808, hashed client IDs 810 and 910 associated with client C1 and client C3, respectively, and a hash wheel 900 for an updated set of DNS clusters that includes DNS cluster slots 802-808 and an added DNS cluster slot 902. A hash generator 830 performs hash operations on client IDs (e.g., client IDs of persistence table entries). In this embodiment, the client IDs 810 and 910 are still mapped to the same hash values on the original hash wheel 800 and the updated hash wheel 900, while the DNS clusters change. Based on the original hash wheel 800, clients C1 and C3 are both assigned DNS cluster DNSC4 (as their home DNS cluster), associated with DNS cluster slot 802, because DNS cluster slot 802 is the next DNS cluster slot in the clockwise direction from the value of both hashed client ID 810 and hashed client ID 910.

In the updated set of DNS clusters, DNS cluster DNSC5 has been added. Accordingly, updated hash wheel 900 includes DNS cluster slot 902, associated with DNS cluster DNSC5. Based on the updated hash wheel 900, client C1 is now assigned DNS cluster DNSC5, associated with DNS cluster slot 902, because DNS cluster slot 902 is the next DNS cluster slot in the clockwise direction from the value of hashed client ID 810. However, client C3 is still assigned to cluster DNSC4, associated with DNS cluster slot 802, because DNS cluster slot 802 is still the next DNS cluster slot in the clockwise direction from the value of hashed client ID 910 in the updated hash wheel 900.

In this example, the persistence table entries of any clients (1) assigned to DNS cluster DNSC4 as their home in the original set of DNS clusters and (2) assigned to DNS cluster DNSC5 as their home in the updated set of DNS clusters would be moved. The reason for the move would be because, DNS cluster slot 902 is mapped between the hashed client ID values of those clients and the DNS cluster slot 802 in the updated hash wheel 900. The other clients assigned to DNS cluster DNSC4 would not be changing home DNS clusters and thus their persistence table entries would not be moved. One of ordinary skill in the art will understand that in embodiments that assign multiple slots to each DNS cluster, a single newly added DNS cluster might become the new home DNS cluster to persistence table entries from multiple other DNS clusters.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
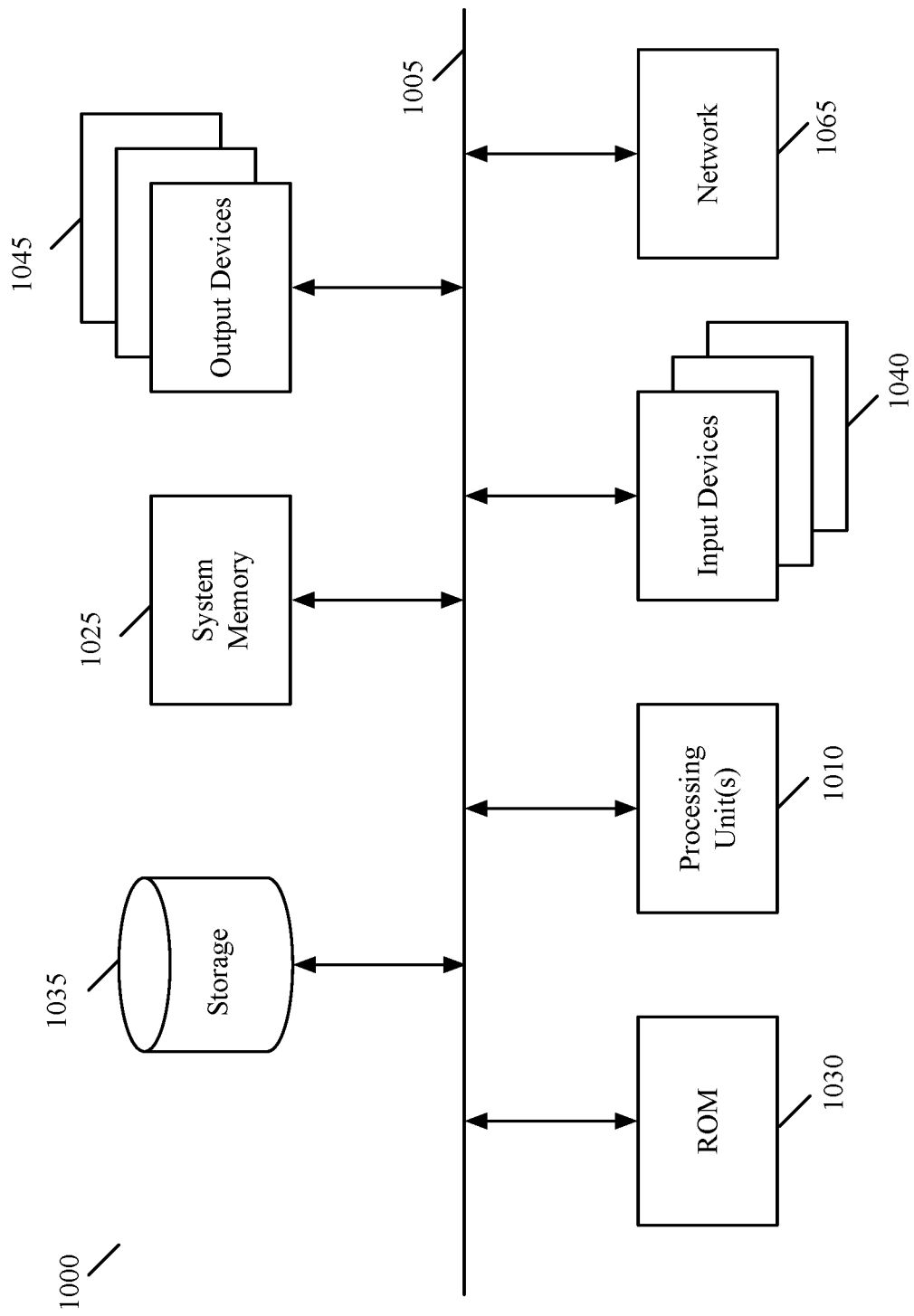
FIG. 10 conceptually illustrates a computer system with which some embodiments of the invention are implemented.

FIG. 10 conceptually illustrates a computer system 1000 with which some embodiments of the invention are implemented. The computer system 1000 can be used to implement any of the above-described hosts, controllers, gateway and edge forwarding elements. As such, it can be used to execute any of the above-described processes. This computer system 1000 includes various types of non-transitory machine-readable media and interfaces for various other types of machine-readable media. Computer system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the computer system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments. The read-only-memory (ROM) 1030 stores static data and instructions that are needed by the processing unit(s) 1010 and other modules of the computer system. The permanent storage device 1035, on the other hand, is a read-and-write memory device. This device is a non-volatile memory unit that stores instructions and data even when the computer system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device 1035. Like the permanent storage device 1035, the system memory 1025 is a read-and-write memory device. However, unlike storage device 1035, the system memory 1025 is a volatile read-and-write memory, such as random access memory. The system memory 1025 stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices 1040 enable the user to communicate information and select commands to the computer system 1000. The input devices 1040 include alphanumeric keyboards and pointing devices (also called "cursor control devices"). The output devices 1045 display images generated by the computer system 1000. The output devices 1045 include printers and display devices, such as cathode ray tubes (CRT) or liquid crystal displays (LCD). Some embodiments include devices such as touchscreens that function as both input and output devices 1040 and 1045.

Finally, as shown in FIG. 10, bus 1005 also couples computer system 1000 to a network 1065 through a network adapter (not shown). In this manner, the computer 1000 can be a part of a network of computers (such as a local area network ("LAN"), a wide area network ("WAN"), or an Intranet), or a network of networks (such as the Internet). Any or all components of computer system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several of the above-described embodiments deploy gateways in public cloud datacenters. However, in other embodiments, the gateways are deployed in a third-party's private cloud datacenters (e.g., datacenters that the third-party uses to deploy cloud gateways for different entities in order to deploy virtual networks for these entities). Thus, one of ordinary skill in the art would understand that the invention is not to be limited by the foregoing illustrative details, but rather is to be defined by the appended claims.

The invention claimed is:

1. A method of re-allocating a set of persistence table entries for a set of clients from an initial set of domain name system (DNS) clusters to an updated set of DNS clusters, the method comprising:
    generating, for the updated set of DNS clusters, a hash wheel comprising a plurality of hash ranges each associated with a DNS cluster;

for each persistence table entry associated with each client, (i) generating, from a client identifier (ID) of the client, a hash value that falls within a hash range of the hash wheel and (ii) identifying a home DNS cluster in the updated set of DNS clusters for the client as the DNS cluster associated with the hash range containing the generated hash value;

for each client that has a different updated home DNS cluster in the updated set of DNS clusters than an initial home DNS cluster in the initial set of DNS clusters, moving the persistence table entry to the updated home DNS cluster; and based on a moved persistence table entry associated with a client, sending, from the updated home DNS cluster of the client, a DNS reply to the client with a virtual internet protocol (VIP) address that is the same as a previous DNS reply sent from the initial home DNS cluster.

2. The method of claim 1, wherein the updated set of DNS clusters has at least one DNS cluster removed from the initial set of DNS clusters and a client has a different updated home DNS cluster in the updated set of DNS clusters because the removed DNS cluster was the initial home DNS cluster of the client.

3. The method of claim 2, wherein the persistence table is moved from the removed client to the different home DNS cluster.

4. The method of claim 1, wherein the updated set of DNS clusters has at least one DNS cluster added to the initial set of DNS clusters and a client has a different updated home DNS cluster in the updated set of DNS clusters because the client is reassigned to the updated DNS cluster.

5. The method of claim 1, wherein re-allocating the persistence tables is performed with all DNS clusters of the initial set of DNS clusters and the updated set of DNS clusters active.

6. The method of claim 5 further comprising deactivating at least one DNS cluster that is a DNS cluster of the initial set of DNS clusters, but not a DNS cluster of the updated set of DNS clusters.

7. The method of claim 1, wherein prior to the moving of the persistence table entries, each persistence table entry is stored only at the home DNS cluster, in the initial set of DNS clusters, of the client associated with the persistence table entry.

8. The method of claim 1, wherein prior to the moving of the persistence table entries, each persistence table entry is stored only at:

the initial home DNS cluster of the client associated with the persistence table entry, and designated backup DNS clusters of the initial home DNS cluster of the client associated with the persistence table entry.

9. The method of claim 8, wherein a number of designated backup clusters of the home DNS cluster is less than 1/10th the total number of DNS clusters in the initial set of DNS clusters.

10. A non-transitory machine readable medium storing a program that when executed by one or more processing units re-allocates a set of persistence table entries for a set of clients from an initial set of domain name system (DNS) clusters to an updated set of DNS clusters, the program comprising sets of instructions for:

generating, for the updated set of DNS clusters, a hash wheel comprising a plurality of hash ranges each associated with a DNS cluster;

for each persistence table entry associated with each client, (i) generating, from a client identifier (ID) of the client, a hash value that falls within a hash range of the hash wheel and (ii) identifying a home DNS cluster in the updated set of DNS clusters for the client as the DNS cluster associated with the hash range containing the generated hash value;

for each client that has a different updated home DNS cluster in the updated set of DNS clusters than an initial home DNS cluster in the initial set of DNS clusters, moving the persistence table entry to the updated home DNS cluster; and based on a moved persistence table entry associated with a client, sending, from the updated home DNS cluster of the client, a DNS reply to the client with a virtual internet protocol (VIP) address that is the same as a previous DNS reply sent from the initial home DNS cluster.

11. The non-transitory machine readable medium of claim 10, wherein the updated set of DNS clusters has at least one DNS cluster removed from the initial set of DNS clusters and a client has a different updated home DNS cluster in the updated set of DNS clusters because the removed DNS cluster was the initial home DNS cluster of the client.

12. The non-transitory machine readable medium of claim 11, wherein the persistence table is moved from the removed client to the different home DNS cluster.

13. The non-transitory machine readable medium of claim 10, wherein the updated set of DNS clusters has at least one DNS cluster added to the initial set of DNS clusters and a client has a different updated home DNS cluster in the updated set of DNS clusters because the client is reassigned to the updated DNS cluster.

14. The non-transitory machine readable medium of claim 10, wherein the set of instructions for re-allocating the persistence tables is performed with all DNS clusters of the initial set of DNS clusters and the updated set of DNS clusters active.

15. The non-transitory machine readable medium of claim 14, wherein the program further comprises a set of instructions for deactivating at least one DNS cluster that is a DNS cluster of the initial set of DNS clusters, but not a DNS cluster of the updated set of DNS clusters.

16. The non-transitory machine readable medium of claim 10, wherein prior to the moving of the persistence table entries, each persistence table entry is stored only at the home DNS cluster, in the initial set of DNS clusters, of the client associated with the persistence table entry.

17. The non-transitory machine readable medium of claim 10, wherein prior to the moving of the persistence table entries, each persistence table entry is stored only at: the initial home DNS cluster of the client associated with the persistence table entry, and designated backup DNS clusters of the initial home DNS cluster of the client associated with the persistence table entry.

18. The non-transitory machine readable medium of claim 17, wherein a number of designated backup clusters of the home DNS cluster is less than 1/10th the total number of DNS clusters in the initial set of DNS clusters.

* * * * *